US012315342B2

(12) United States Patent
Zhang et al.

(10) Patent No.: US 12,315,342 B2
(45) Date of Patent: May 27, 2025

(54) GAMING SYSTEMS AND METHODS FOR REMOVING A GAME SYMBOL FROM A REEL

(71) Applicant: IGT, Las Vegas, NV (US)

(72) Inventors: Xiaodong Zhang, Beijing (CN); Hong Li, Beijing (CN)

(73) Assignee: IGT, Las Vegas, NV (US)

( * ) Notice: Subject to any disclaimer, the term of this patent is extended or adjusted under 35 U.S.C. 154(b) by 284 days.

(21) Appl. No.: 17/213,468

(22) Filed: Mar. 26, 2021

(65) Prior Publication Data

US 2022/0309875 A1 Sep. 29, 2022

(51) Int. Cl.
*G07F 17/32* (2006.01)
*G07F 17/34* (2006.01)

(52) U.S. Cl.
CPC ...... *G07F 17/3267* (2013.01); *G07F 17/3213* (2013.01); *G07F 17/34* (2013.01)

(58) Field of Classification Search
CPC ............. G07F 17/3262; G07F 17/3267; G07F 17/3213; G07F 17/34
See application file for complete search history.

(56) References Cited

U.S. PATENT DOCUMENTS 8,147,334 B2 4/2012 Gatto et al.
8,764,566 B2 7/2014 Miltenberger et al.
10,013,846 B2 * 7/2018 Carranza ............. G07F 17/3225
10,089,819 B1 * 10/2018 Halvorson .......... G07F 17/3209
10,147,264 B1 * 12/2018 Halvorson .......... G07F 17/3216
10,872,500 B2 12/2020 Peterson et al.
11,074,786 B2 7/2021 Peterson et al.
2002/0107068 A1 * 8/2002 Baerlocher ............. G07F 17/34 463/20
2003/0013514 A1 * 1/2003 Cregan ............... G07F 17/3267 463/20
2003/0144052 A1 * 7/2003 Walker .................... G07F 17/34 463/20
2003/0157981 A1 * 8/2003 Marks ................. G07F 17/3265 463/20

(Continued)

OTHER PUBLICATIONS

U.S. Appl. No. 17/211,361, filed Mar. 24, 2021.

(Continued)

*Primary Examiner* — Dmitry Suhol
*Assistant Examiner* — Jason Pinheiro
(74) *Attorney, Agent, or Firm* — Sheridan Ross P.C.

(57) ABSTRACT

The present disclosure relates generally to systems and methods for providing game symbol removal operations in games. The game symbol removal operation allows a player of the gaming device to provide input regarding a set of game symbols to be removed from a first configuration of an array of cells. Removing the game symbol(s) in the set of game symbols from the first configuration of the array of cells forms a second configuration of the array of cells. A selected game symbol of the unremoved game symbols can have a higher probability of being a first game payline on the array of cells in the second configuration than on the array of cells in the first configuration. Removal of a particular game symbol from the array of cells allows a player to control his or her chances of winning and alter the proposed payouts for winning distributions of game symbols for at least one subsequent play of the game.

20 Claims, 14 Drawing Sheets

(56) References Cited

U.S. PATENT DOCUMENTS

| | | | | |
|---|---|---|---|---|
| 2004/0048646 | A1* | 3/2004 | Visocnik | G07F 17/32 463/16 |
| 2007/0060348 | A1* | 3/2007 | Svanas | G07F 17/34 463/31 |
| 2008/0194327 | A1* | 8/2008 | Anderson | G07F 17/3211 463/20 |
| 2009/0124325 | A1* | 5/2009 | Wadleigh | G07F 17/34 463/20 |
| 2009/0131150 | A1* | 5/2009 | Iverson | G07F 17/3211 463/20 |
| 2009/0137311 | A1* | 5/2009 | Iverson | G07F 17/3213 463/20 |
| 2009/0258701 | A1* | 10/2009 | Crowder, Jr. | G07F 17/3211 463/31 |
| 2014/0228092 | A1* | 8/2014 | Inamura | G07F 17/3267 463/20 |
| 2014/0329591 | A1* | 11/2014 | Caputo | G07F 17/3258 463/29 |
| 2015/0148117 | A1* | 5/2015 | Falciglia, Sr. | G07F 17/3248 463/20 |
| 2015/0348374 | A1* | 12/2015 | Dupuis | G07F 17/34 463/20 |
| 2015/0363998 | A1* | 12/2015 | Comeau | G07F 17/3265 463/20 |
| 2016/0063817 | A1* | 3/2016 | Guinn | G07F 17/3258 463/22 |
| 2016/0078711 | A1* | 3/2016 | Rucker | G07F 17/326 463/21 |
| 2020/0111329 | A1 | 4/2020 | Rothchild et al. | |
| 2021/0319662 | A1 | 10/2021 | Adamek et al. | |

OTHER PUBLICATIONS

"Slot machine," Wikipedia, last edited Dec. 21, 2020, 22 pages [retrieved online Jan. 6, 2021 from: en.wikipedia.org/wiki/Slot_machine#Reels].

* cited by examiner

GAMING SYSTEMS AND METHODS FOR REMOVING A GAME SYMBOL FROM A REEL

BACKGROUND

The present disclosure is generally directed to gaming systems and, in particular, towards gaming systems that use a game symbol in a game, such as a slot game.

Gaming machines typically offer a number of built-in game play features that contribute to the overall player experience. For example, some slot games insert a stack of a common game symbol on a reel to enhance a player's experience. Any type of game play feature that presents the player with an additional opportunity to win is often viewed as desirable and can lead to increased play of the gaming machine.

BRIEF SUMMARY

In some embodiments, a method is provided, comprising: receiving first input of a player regarding a set of game symbols to be removed from a plurality of game symbols in a first configuration of a reel; removing a selected game symbol in the set of game symbols from the first configuration of the reel to form a second configuration of the reel, wherein, in the first configuration of the reel, the selected game symbol has a first weight towards inclusion in a first game payline (and therefore towards a game payline outcome) and, in the second configuration of the reel, a second weight towards inclusion in the first game payline, the first weight being less than the second weight; initiating, in response to second input of the player, a play of the reel in the second configuration to produce a first game payline; and determining a first game outcome from the first game payline.

In some embodiments, a gaming device is provided, comprising: a set of reels, wherein, in a first configuration, each reel in the set of reels comprises a plurality of game symbols; a user interface; a credit meter; a processor coupled with the user interface and credit meter; and a computer-readable storage medium, coupled with the processor, comprising instructions that are executable by the processor, wherein the instructions comprise instructions that cause the processor to: receive first input of a player regarding a set of game symbols to be removed from the first configuration of a reel in the set of reels; remove a selected game symbol in the set of game symbols from the first configuration of the reel to form a second configuration of the reel, wherein, in the first configuration of the reel, a selected game symbol of the plurality of game symbols has a first probability of being a first game payline and, in the second configuration of the reel, the selected game symbol has a second probability of being the first game payline, the first probability being different than the second probability; initiate, in response to second input of the player via the user interface, a play of the set of reels comprising the reel in the second configuration to produce a first game payline; and determine a first game outcome from the first game payline.

In some embodiments, a system is provided, comprising: a processor; and a computer-readable storage medium, coupled with the processor, comprising instructions that are executable by the processor, wherein the instructions cause the processor to: based on a first input of a player, remove a selected game symbol in a set of game symbols from a plurality of game symbols in a first configuration of an array of cells to form a second configuration of the array of cells, wherein, in the first configuration of the array of cells, a selected game symbol of the plurality of game symbols has a first probability of being in a first distribution of game symbols in the array of cells, wherein each cell in the array of cells comprises a discrete game symbol in the first distribution of game symbols and, in the second configuration of the array of cells, the selected game symbol has a second probability of being in the first distribution of game symbols, wherein each cell in the array of cells comprises a discrete game symbol in the first distribution of game symbols, the first probability being different than the second probability; initiate, in response to second input of a player, a play of a game comprising the array of cells in the second configuration to produce the first distribution of game symbols; and determine a first game outcome from the first distribution of game symbols.

Additional features and advantages are described herein and will be apparent from the following Description and the figures.

DETAILED DESCRIPTION

Figure 1A:
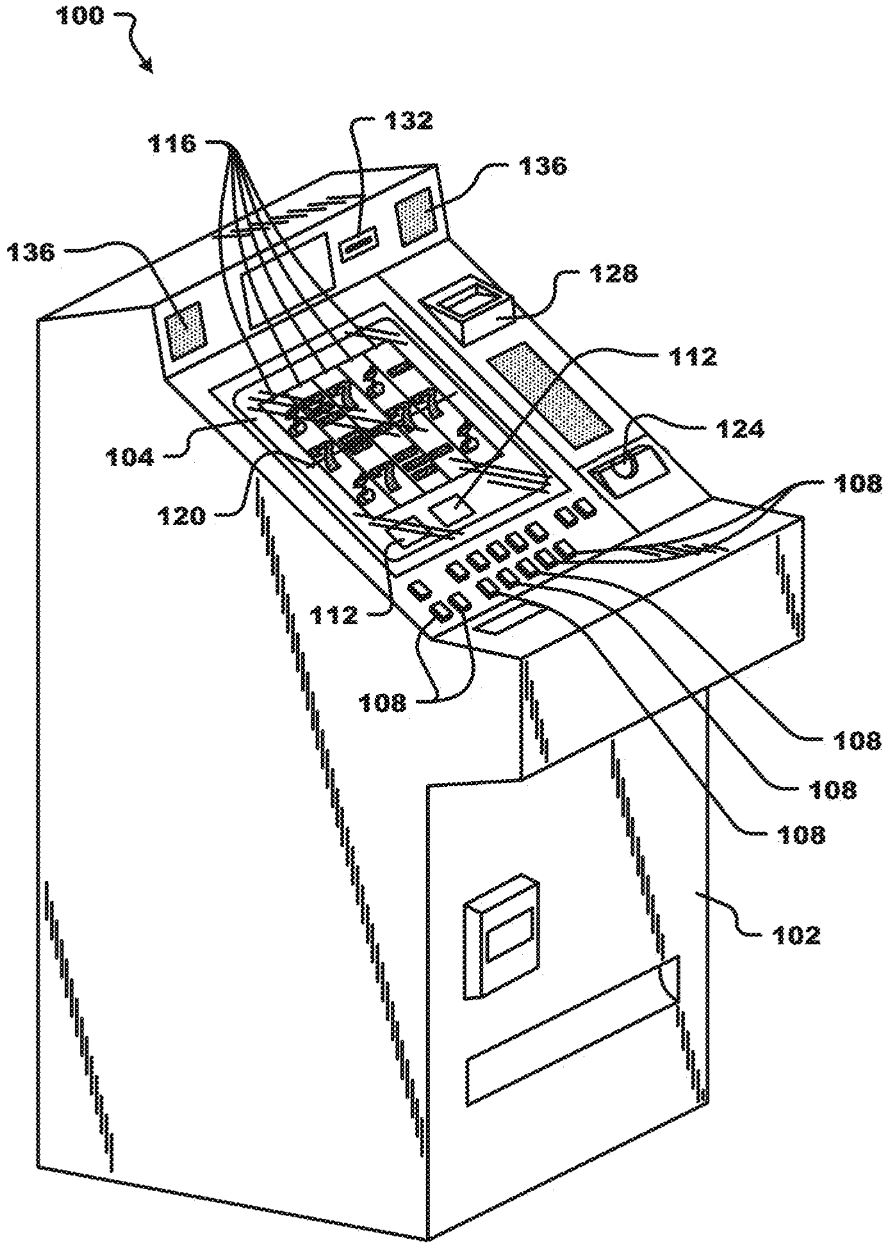
FIG. 1A depicts one example of a computational gaming device for enabling enhanced gaming features and game symbol removal operations.

Embodiments of the present disclosure will be described in connection with gaming systems having one or multiple gaming devices that are capable of providing game symbol removal operations from one or more cells of a game. In a reel-spin or slot game for example, a set of one or more game symbols is removed from the first configuration of an array of cells comprising one or more reels to form a second configuration of the array of cells or reels, which the player can spin to produce a game payline that determines the game outcome. Game symbol removal can be done dynamically in response to one or more game events whether in a different game or in the game itself.

The set of game symbols can be removed from a subset of or all of the columns (e.g., reels) and/or rows of cells in the array. The removable game symbol can be disposed in any position, such as the first position (e.g., the highest priority position), final position (e.g., the lowest priority position), or any intervening position of a distribution of game symbols in the presentation order of the array of cells.

Removal of the game symbol may be restricted to a selected full row, full column, and/or full diagonal line in the array of cells. The term "full," as used herein, may refer to total number of cells required to produce a distribution of game symbols that comport with rules of the game and produce a game outcome. For example, a reel-spin game (e.g., slots game, etc.) having four separate reels may require four cells, each containing a game symbol or an absence of a game symbol, to align along a payline to identify the distribution of game symbols that produces a particular game outcome. In this example, a total number of four cells arranged along the payline (e.g., a line) comprise the full row that produces the game outcome of the reel-spin game.

Alternatively or additionally, the set of game symbols can apply only to certain occurrences of the game symbols but not others. For example, a selected row or column of the array of cells can have multiple occurrences of a type of game symbol (e.g., a minor game symbol, a major game symbol, or a special game symbol) and, after the game symbol removal operation, the selected row or column can still contain one or more occurrences of the type of game symbol but the number of occurrences after game symbol removal is less than before game symbol removal.

Regardless of how the game symbol removal operation is performed, the probability of the game outcome being a winning outcome in accordance with the rules can be increased relative to a game outcome for the original array of cells. As will be appreciated, each game symbol in each cell of the array has a weight towards its inclusion in an outcome of the game. As an example, in a slot game each game symbol on a reel has a weight towards its inclusion in a payline of a spin of the reel. Due to the reduced number of game symbols on the reel after game symbol removal, the relative weights of each of the remaining game symbols before removal (or in the first reel configuration) is less than the relative weights of each of the remaining game symbols after removal (or in the second reel configuration). For example, a reel of a slot game normally comprises from 10 to 15 game symbols; the removal of one or more of these game symbols to form the modified reel increases the relative weight of each of the remaining game symbols in determining the output of the reel to the payline. As the reel contains different numbers of different types of game symbols, the relative weights of the remaining game symbols depends on the game symbol type and numbers removed. For example, removing the more numerous minor game symbols from the reel can have a greater adjustment to the weights of the remaining game symbols than removing the less numerous major game symbols. As a result, the probability of a selected game symbol remaining on the reel in the second configuration appearing on the payline after a spin of the reel in the second configuration is higher than the probability of the selected game symbol appearing on the payline after a spin of the reel in the first configuration.

The game symbol removal operation can allow a player of the gaming device to provide his or her input regarding the set of game symbols to be removed from the array of cells of the game (e.g., from one or more reels of a slot game) prior to a next play of the game (e.g., a next spin of the reels of the slot game). The player input can be provided in many different ways, such as in the form of an output of another game involving one or more players (e.g., a wheel game or a match game) and/or a random or pseudorandom number generator.

The game symbol removal operation can be contingent upon occurrence of a predetermined event. The game symbol removal feature, for example, can be implemented as a bonus feature dependent upon an outcome of the game or upon some other criterion, such as a wager or side wager of the player, a credit balance of a player, and the like.

In a reel-spin game, a spin counter can be employed to determine how many spins the player may have of a reel in the second configuration. Each reel or removed game symbol may have an independent spin counter. For example, the spin counter may have a first value for a first reel or removed game symbol and a different second value for a different second reel or removed game symbol. Alternatively, some or all of the reels and removed game symbols may have a common spin counter value.

The game symbol removal feature and game symbol removal operation can provide an improved gaming experience by providing a player not only with a higher probability of a winning outcome in a game but also with an additional skill-based or non-skill-based game (e.g., game of chance) to determine which and how many game symbols are to be removed from the array of cells and therefore a magnitude of increase of the player's probability of receiving a winning outcome in the game. Removal of a particular game symbol from the array of cells can not only allow a player to control his or her chances of winning but also alter the proposed payouts for winning distributions of game symbols for at least one subsequent play of the game. The game symbol removal feature and game symbol removal operation can therefore present the player with an additional opportunity to win and higher levels of player anticipation, excitement, and satisfaction during gameplay and lead to increased play of the gaming machine. Among other things, embodiments of the present disclosure provide a player with more ways to win a game, the ability to alter the chances of winning in a game, and the ability to alter the payout amount for a winning game outcome, as well as add excitement to the overall game-playing experience of games.

The game symbol removal process, which may or may not be automated, will be described as being performed in connection with a spin feature, but it should be appreciated that embodiments of the present disclosure are not so limited. Furthermore, while examples of the present disclosure will be described in connection with games that present an array of cells (e.g., bingo, keno, slot games, reel-based games, etc.) that are primarily known as games of chance, it should be appreciated that the game symbol removal processes can also be provided in other game types (e.g., games of skill such as matching games, games of chance and skill, games of chance with bonus games of skill, games of skill with bonus games of chance, non-reel-based games, etc.).

The gaming devices may comprise a computational device, such as a slot machine or Electronic Gaming Machine (EGM), that implements a game symbol removal and subsequent play operation. While embodiments of the present disclosure will be described in connection with the example of a slot machine, or electronic gaming machine (EGM), virtual gaming machine, or video gaming gambling machine (VGM) implementing game symbol removal operations, it should be appreciated that embodiments of the present disclosure are not so limited. For instance, other types of computational devices, such as portable user devices, smartphones, tablets, laptops, Personal Computers (PCs), wearable devices, table games, etc. may be used to implement game enhancement features as part of a game as described herein.

The game symbol may correspond to any game symbol that occupies a cell in a game. The game symbol, as used herein, may be any game symbol (e.g., standard reel icon or normal game symbol, wild game symbol, scatter game symbol, major game symbol, minor game symbol, special game symbol, bonus game symbol, multiplier, etc.) used in the game. By way of example, the game symbol in an electronic reel-spin, or slots, game may correspond to a game symbol used in the electronic reel-spin game such as a "seven" game symbol, a "fruit" game symbol, a "BAR" game symbol, a "diamond" game symbol, a "gem game symbol," a "multiplier" game symbol, and/or some other game symbol used in the electronic reel-spin game. Continuing this example, when a player spins the reels of the electronic reel-spin game a random number generator may be used to randomly assign these game symbols to the cells in the array of cells. The random number generator may be used to randomly designate one game symbol in the array of cells as the removable game symbol for a later spin. In the reel-spin game example, a "cherry" may be defined (e.g., by the rules of the reel-spin game, etc.) as a winning game symbol when found in a first position of the presentation order of the array of cells. In some embodiments, the rules of the reel-spin game may define game outcomes for game symbol types, game symbol types in particular distributions or orders, game symbol types in particular cells in the presentation order of the array of cells, and/or the like.

The game symbol removal operation and associated features may be activated, as described herein, during play of a game, after a play of the game, and/or prior to a play of the game. As mentioned above, the game symbol removal operation may be made available within the context of a slot game, a matching game, a wheel game, a bingo game, a keno game, a poker machine, or in any other game of chance that awards particular game symbol combinations relative to positions on a user interface.

Figure 1B:
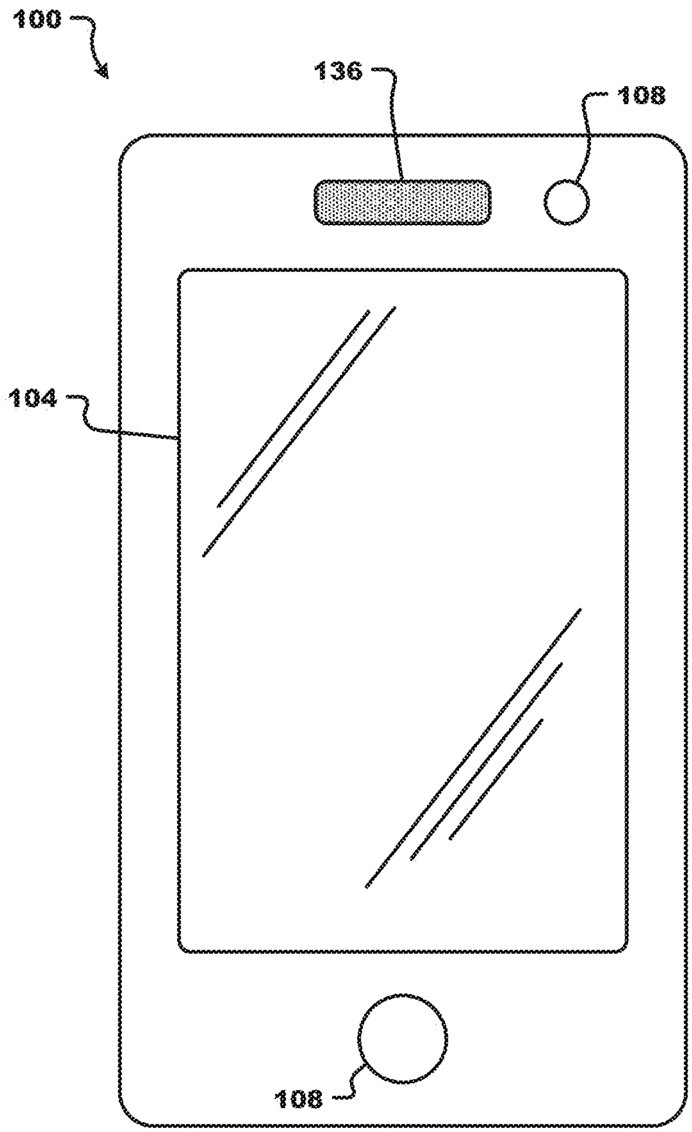
FIG. 1B depicts another example of a computational gaming device for enabling enhanced gaming features and game symbol removal operations.

With reference now to FIGS. 1A and 1B, an illustrative computational device 100 that may be used to implement a game or the like will be described in accordance with at least some embodiments of the present disclosure. A computational device 100 may include a portable or non-portable device used for executing a gaming application or multiple different gaming applications without departing from the scope of the present disclosure. Non-limiting examples of a computational device include an EGM, a Video Gaming Machine (VGM), a mobile communication device (e.g., a smartphone, laptop, tablet, wearable device, etc.), a personal computer (PC), etc. An EGM or VGM-type of computational device 100 is shown in FIG. 1A in accordance with embodiments of the present disclosure.

The illustrative computational device 100 of FIG. 1A is shown to include a support structure, housing or cabinet, 102 which provides support for a plurality of displays, inputs, controls and other features of a conventional gaming machine. In the illustrated embodiment, a player plays the computational device 100 while sitting, however, the computational device 100 is alternatively configured so that a player can operate it while standing or sitting. The illustrated computational device 100 is positioned on the floor but can be positioned alternatively (i) on a base or stand, (ii) as a pub-style table-top game (e.g., where the participant computational devices are located remotely from the shared wheel as discussed below), (iii) as a stand-alone computational device on the floor of a casino with other stand-alone computational devices, or (iv) in any other suitable manner. The computational device 100 can be constructed with varying cabinet and display configurations.

In one embodiment, a computational device 100 is configured to randomly generate awards and/or other game outcomes based on probability data. Since a computational device 100 generates outcomes randomly or based upon a probability calculation, there is no certainty that the computational device 100 will provide the player with any specific award or other game outcome.

In some embodiments, a computational device 100 may employ a predetermined or finite set or pool of awards, progressive awards, prizes or other game outcomes. As each award or other game outcome is provided to the player, the computational device 100 removes the provided award or other game outcome from the predetermined set or pool. Once removed from the set or pool, the specific provided award or other game outcome cannot be provided to the player again. The computational device 100 provides players with all of the available awards or other game outcomes over the course of the play cycle and guarantees a designated number of actual wins and losses.

The computational device 100 may include one or more displays 112. An illustrative display 112 may include a credit display that displays a player's current number of credits, cash, account balance or the equivalent. Another illustrative display 112 may include a bet display that displays a player's amount wagered.

The computational device 100 is also shown to include at least one payment acceptor. Illustrative payment acceptors may include, without limitation, a coin slot 124, where the player inserts coins or tokens, and a ticket, note, or bill acceptor 128, where the player inserts a bar-coded ticket, note, or cash. In one embodiment, a player-tracking card, credit card, debit card, or data card reader/validator 132 is also provided for accepting any of those or other types of cards as a form of payment toward playing a game on the computational device 100.

In one embodiment, a player inserts an identification card into card reader 132 of computational device 100. The identification card can be a smart card having a programmed microchip or a magnetic strip coded with a player's identification, credit totals, and other relevant information. In one embodiment, money may be transferred to computational device 100 through an electronic fund transfer and card reader 132 using the player's credit, debit, or smart card. When a player funds the computational device 100, a processor of the computational device 100 may determine the amount of funds or credits entered and the corresponding amount is shown on the credit or other suitable display 112 as described above.

In one embodiment, after appropriate funding of computational device 100, the player presses an input device 108 to initiate game play. The input devices 108 may include various types of buttons, levers, gesture inputs, cameras, etc., that enable a player to start any game play or distribution of events. In one embodiment, upon appropriate funding, computational device 100 begins game play automatically. In another embodiment, the player needs to actuate or activate one of the play buttons to initiate play of computational device 100. Other non-limiting types of input devices 108 may include a "bet one" button, a "max bet" button, or any other type of button known to be included in an EGM, VGM, or the like. It should further be appreciated that the input devices 108 may correspond to a physical button, a virtual button on a touch-screen of a game, an input element on a Graphical User Interface (GUI), or a combination thereof. In other words, the input devices 108 do not need to correspond to a physical button. In some embodiments, the player places a bet by pushing a "bet one" button (e.g., betting an amount equal to one credit for the next play). The player may increase the player's wager by one credit each time the player pushes "bet one" button. When the player pushes the "bet one" button, the number of credits shown in the credit display decreases by one, and the number of credits shown in the bet display increases by one. A "max bet" button can also be provided, which enables the player to bet the maximum wager (e.g., max lines, max wager per line, and re-spin operation). The computational device 100 may include other suitable wager buttons, such as a "repeat bet" button (e.g., repeating the bet made from the immediately last play of the computational device 100 for the next play of the computational device 100), one or more "select paylines" buttons, a "select re-spin operation" button, and one or more "select wager per payline" buttons.

Another type of input device 108 that may be provided on the computational device 100 is a physical cash out button, a virtual cash out button, a selectable GUI element, or the like. The player presses a cash out button and cashes-out to receive a cash payment or other suitable form of payment corresponding to the number of remaining credits. The player can receive coins or tokens in a coin payout tray or a ticket or credit slip, which are redeemable by a cashier or funded to the player's electronically-recordable identification card.

The computational device 100 may also include one or more display screens 104 and one or more sound generating devices 136. The combination of outputs provided on a display screen 104 and sound generating device 136 may contribute to the game play experience and, in some embodiments, may provide the player with information regarding a status of a game play event or distribution of events.

In one embodiment, the sound generating device 136 may include at least one speaker or other type of transducer for generating audible sounds, playing music, etc. In one embodiment, a computational device 100 provides dynamic sounds coupled with attractive multimedia images displayed on the display screen 104 to provide an audio-visual representation or to otherwise display full-motion video with sound to attract players to the computational device 100. During idle periods, the computational device 100 displays a distribution of audio and/or visual attraction messages to attract potential players to the computational device 100.

In one embodiment, a base or primary game includes a slot game with one or more paylines 120. As will be discussed in further detail herein, the game provided by the computational device 100 may support one or multiple paylines 120, which may extend across the display screen 104 vertically, horizontally, diagonally, at adjusted angles, etc. In some embodiments, such as for a slot game, a payline 120 intersects a plurality of reels 116, such as three to five reels. Each reel 116 of the display screen 104 may be used to display different sets of game symbols in connection with game play activity provided by the computational device 100. In some embodiments, each reel 116 may operate independent of all other reels and the game symbols displayed by a reel 116 at the end of a given spin may depend upon random numbers generated by the computational device 100. The positions of game symbols on each reel 116 and in the combination of reels 116 may form the array of cells in the presentation order rendered to the display screen 104 of the computational device 100.

The reels 116 may be provided in video form with simulated reels being displayed via the display screen 104. A reel 116 may be used to display any number of game symbols such as bells, hearts, fruits, numbers, letters, bars or other images and game symbols, which preferably correspond to a theme associated with a game provided by the computational device 100. With a slot game, the computational device 100 may be configured to award prizes, awards, or other game play opportunities when the reels 116 stop spinning and a predetermined game symbol combination lands across an active payline 120 (e.g., a payline 120 that is currently being wagered and is subject to evaluation for a win after the reels 116 have stopped spinning).

FIG. 1B illustrates another example of a computational device 100 in accordance with at least some embodiments of the present disclosure. This particular example of computational device 100 may correspond to a portable computational device 100 such as a mobile smartphone, tablet, wearable, etc. The computational device 100 may be owned by a user of the device 100 rather than being owned by a casino operator.

The computational device 100 again includes a display screen 104, a plurality of input devices 108, and at least one speaker 136. In some embodiments, the display screen 104 may correspond to a touch-sensitive display screen, meaning that the display screen 104 is simultaneously capable of displaying information (e.g., in connection with game play activity) and receiving a user input. In some embodiments, the touch-sensitive display screen 104 may provide game features similar to a cabinet-style computational device 100 without requiring all of the dedicated buttons provided by a cabinet-style computational device 100.

Figure 2:
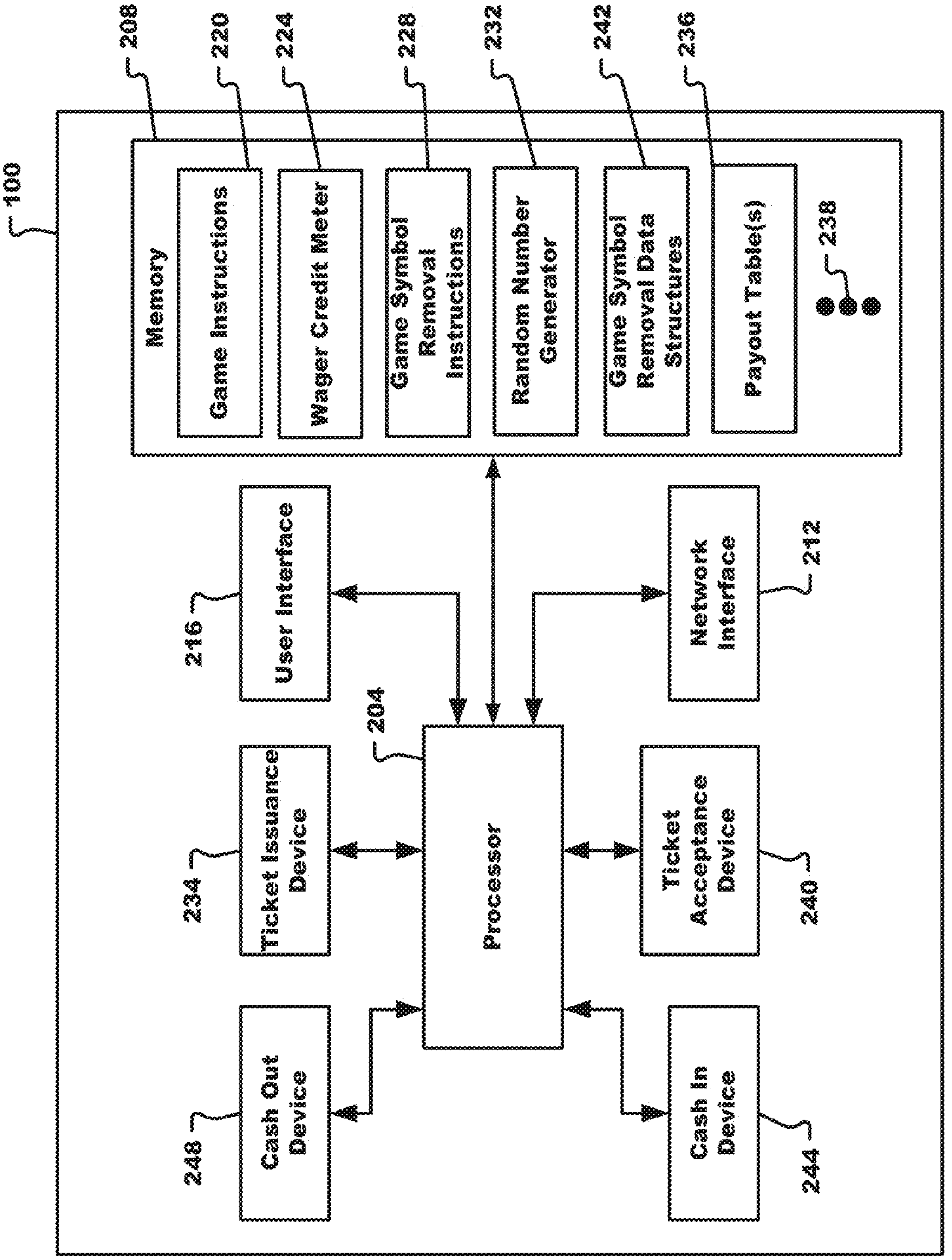
FIG. 2 is a block diagram depicting components of a computational gaming device for enabling enhanced gaming features and game symbol removal operations.

With reference now to FIG. 2, additional details of the components that may be included in a computational device 100 will be described in accordance with at least some embodiments of the present disclosure. The computational device 100 is shown to include a processor 204, memory 208, a network interface 212, and a user interface 216. In some embodiments, the processor 204 may correspond to one or many microprocessors, Central Processing Units (CPUs), microcontrollers, Integrated Circuit (IC) chips, or the like. The processor 204 may be configured to execute one or more instruction sets stored in memory 208. In some embodiments, the instruction sets stored in memory 208, when executed by the processor 204, may enable the computational device 100 to provide game play functionality.

The nature of the network interface 212 may depend upon whether the network interface 212 is provided in cabinet-style computational device 100 or a mobile computational device 100. Examples of a suitable network interface 212 include, without limitation, an Ethernet port, a Universal Serial Bus (USB) port, an RS-232 port, an RS-485 port, a network interface controller (NIC), an antenna, a driver circuit, a modulator/demodulator, etc. The network interface 212 may include one or multiple different network interfaces depending upon whether the computational device 100 is connecting to a single communication network or multiple different types of communication networks. For instance, the computational device 100 may be provided with both a wired network interface 212 and a wireless network interface 212 without departing from the scope of the present disclosure.

The user interface 216 may include a combination of the user input and user outputs described in connection with FIGS. 1A and 1B. For instance, the user interface 216 may include the display screen 104, the input devices 108, the speakers 136, or any other component that is capable of enabling user interaction with the computational device 100. The user interface 216 may also include one or more drivers for the various hardware components that enable user interaction with the computational device 100.

The memory 208 may include one or multiple computer memory devices that are volatile or non-volatile. The memory 208 may be configured to store instruction sets that enable player interaction with the computational device 100 and that enable game play at the computational device 100. Examples of instruction sets that may be stored in the memory 208 include a game instruction set 220, a credit meter 224, and a game symbol removal instruction set 228. In addition to the instruction sets, the memory 208 may also be configured to store a random number generator 232 that is used by the game instruction set 220 and/or game symbol removal instruction set 228, for example, to provide game outputs, game symbol removal data structures 242 to track a state of the game symbol removal operation, and one or more payout table(s) 236 to determine a payout for a game outcome.

In some embodiments, the game instruction set 220, when executed by the processor 204, may enable the computational device 100 to facilitate one or more games of chance or skill and produce interactions between the player and the game of chance or skill. In some embodiments, the game instruction set 220 may include subroutines that present one or more graphics to the player via the user interface 216, subroutines that calculate whether a particular wager has resulted in a win or loss during the game of chance or skill, subroutines for determining payouts for the player in the event of a win, subroutines for exchanging communications with another device, such as a server, subroutines for determining random removable game symbol appearances or bonus game symbol appearances during game play, and any other subroutine useful in connection with facilitating game play at the computational device 100.

In some embodiments, the game instruction set 220 may include instructions that initiate a reel spin at the various reels 116 in connection with game play. In some embodiments, the random number generator 232 is used to determine a final position of the reels 116 after the spin is completed. The game instruction set 220 may also be configured to present game symbols via the display screen 104 when the reels 116 correspond to video reels or the like. The game instruction set 220 may also be configured to evaluate a position of game symbols relative to one or more paylines 120, relative to predetermined cells in an array of cells and any other evaluation desired to facilitate game play.

The credit meter 224 may correspond to an instruction set within the computational device 100 that facilitates a tracking of wager activity at the computational device 100. In some embodiments, the credit meter 224 may be used to store or log information related to various player activities and events that occur at the computational device 100. The types of information that may be maintained in the credit meter 224 include, without limitation, player information, available credit information, wager amount information, and other types of information that may or may not need to be recorded for purposes of accounting for wagers placed at the computational device 100 and payouts made for a player during a game of chance or skill played at the computational device 100.

In some embodiments, the credit meter 224 may be configured to track coin in activity, coin out activity, coin drop activity, jackpot paid activity, credits applied activity, external bonus payout activity, voucher in activity, voucher out activity, timing of events that occur at the computational device 100, and the like. In some embodiments, certain portions of the credit meter 224 may be updated in response to outcomes of a game of chance or skill played at the computational device 100.

The game symbol removal instruction set 228 may correspond to a subroutine that is called by the game instruction set 220 during game play. In some embodiments, the game symbol removal instruction set 228 may be called by the game instruction set 220 when the game instruction set determines that a game symbol removal operation is available to the player and/or that a particular game symbol in the array of cells is assigned as a removable game symbol. In some embodiments, the game symbol removal instruction set 228 is configured, when executed by the processor 204, to prompt a player for input on whether he or she desires to select a set of one or more game symbols for removal from one or more cell locations (e.g., such as by placing a wager or side wager of a certain amount or using a predetermined amount of accrued credits stored in the wager credit meter 224) and, if the player elects this option, to inform the game instruction set 220 to enable the player to select the set of game symbols, such as by a match game, wheel game, random number generator, and the like, for removal from the cell locations in a subsequent game play of the game (e.g., a re-spin operation). The game symbol removal instruction set 228 may further receive and remove the set of game symbols to be removed from a first configuration of a reel to form a second configuration of the reel. The game symbol removal instruction set 228 may then instruct the game instruction set 220 to perform one or more spins of the reel in the second configuration to product a game payline and determine a game outcome from the game payline. The game symbol removal instruction set 228 may further inform the game instruction set 220 of a maximum number of spins of the reel in the second configuration or, alternatively, inform the game instruction set 220 when a spin counter instantiated for the reel when in the second configuration has realized a maximum value representative of a maximum number of spins, at which pint the reel is returned to the first configuration for subsequent game play.

The random number generator 232 generates a distribution of numbers or game symbols that are not reasonably predictable by a random chance. Random number generators can be truly random hardware random generators (HRNGS), which generate random numbers as a function of current value of some physical environment attribute that is constantly changing in a manner that is practically impossible to model, or pseudo-random number generators (PRNGS), which generate numbers that look random, but are actually deterministic, and can be reproduced if the state of the PRNG were known. In some applications, the random number generator 232 uses computational algorithms that can produce long sequences of apparently random results, which are in fact determined by a shorter initial value, known as a seed value or key.

In one embodiment, the random number generator 232 is a PRNG, which constantly generates a sequence of simulated random numbers, at a rate of hundreds or perhaps thousands per second. As soon as a "play" button is pressed or other game initiation is received from the player, the most recent random number is used to determine the result. This means that the result varies depending on exactly when the game is played.

The game symbol removal data structures 242 comprise a number of data structures that monitor the state and operation of the game symbol removal instruction set 228. The game symbol removal data structures 242 are further described in connection with FIG. 9 below.

The payout table(s) 236 comprise one or more payout tables used to convert a game outcome, or reel payline, into a payout to the player. Different cell array and reel configurations can have a common or different payout tables depending on the application. For example, the reel or cell array in the first configuration can have a different payout table compared to the reel or cell array in the second configuration. The payout tables 236 can be mapped to a corresponding set of game symbols to be removed from a re& or cell and optionally a number of reels or cells to be modified by the removed game symbols. By way of further illustration, a set of game symbols may be removed from a first but not a second reel or cell in one game configuration and from the first and second reels or cells in a different game configuration. The different game configurations can have the same or different payout tables. The payout able 236 is further described in connection with FIG. 10 below.

While shown as separate instruction sets, it should be appreciated that the game symbol removal instruction set 228 may correspond to a subroutine of the game instruction set 220 without departing from the scope of the present disclosure. Additional details and functional capabilities of the game symbol removal instruction set 228 working in cooperation with the game instruction set 220 will be described in connection with FIGS. 3-12.

The computational device 100 is further shown to include a ticket issuance device 234, a ticket acceptance device 240, a cash in device 244, and a cash out device 238. The ticket issuance device 234 may be configured to receive physical tickets, vouchers, or player loyalty cards. In some embodiments, the ticket issuance device 234 and ticket acceptance device 240 may operate in concert with the ticket acceptor 128. In such an embodiment, the ticket acceptor 128 may correspond to the physical components that receive and issue a ticket or voucher whereas the ticket issuance device 234 and the ticket acceptance device 240 correspond to the drivers and/or firmware components that control operation of the ticket acceptor 128. It should also be appreciated that the card reader 132 may be in communication with the ticket issuance device 234 and the ticket acceptance device 140 and may have functionality driven by one or both of these devices. For instance, the card reader 132 may correspond to the physical hardware components that receive information from a player loyalty card (or player loyalty application running on a mobile communication device, etc.) and that information may be processed by the ticket acceptance device 240 when receiving player credits from cards read by the card reader 132. The ticket issuance device 234 may provide the card reader 132 with information for applying wager credits back to a player card when a player is done with a game play session and wishes to transfer credits from the credit meter 224 back onto their card. Thus, the ticket issuance device 234 and ticket acceptance device 240 may also operate as a driver and/or firmware component for the card reader 132.

Similarly, the cash in device 244 and cash out device 248 may include or operate in concert with the coin slot 124 and any coin delivery mechanisms. The cash in device 244 and cash out device 248 may include hardware, drivers, or firmware that facilitate receiving or distributing cash, tokens, bills, etc. In some embodiments, the cash in device 244 may be configured to determine an amount of cash (e.g., in coins, bills, etc.), an amount or number of tokens, etc., input at the coin slot 124 and convert the values into credits for playing games with the game instruction set 220. The cash out device 248 may correspond to hardware and software configured to output coins, tokens, bills, etc. if a player decides to cash out or convert playing credits back into cash, tokens, bills, etc.

Figure 3:
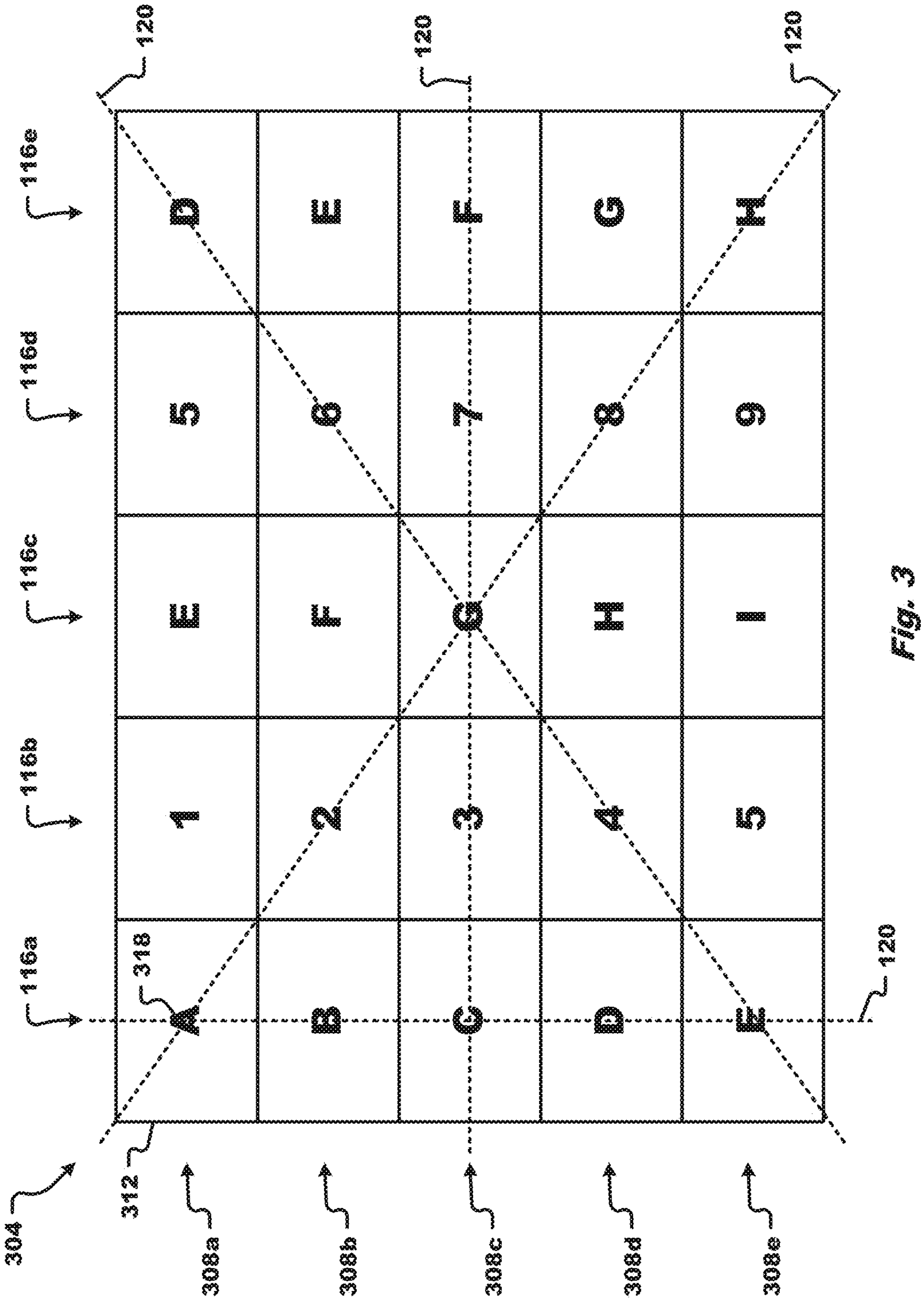
FIG. 3 is an illustrative layout of game symbols rendered to an array of cells of a game.

With reference now to FIGS. 3 to 12, various operations of the game instruction set 220 and the game symbol removal instruction set 228 will be described in accordance with at least some embodiments of the present disclosure. Referring initially to FIG. 3, a first layout of game symbols 318 rendered to an array of cells 304 of a game will be described in accordance with embodiments of the present disclosure. The array of cells 304 may be presented, or otherwise rendered, with the display screen 104. In some embodiments, the game instruction set 220 may control which particular game symbols 318 are presented within a particular cell 312 in the array of cells 304. The illustrative array of cells 304 is shown to include five columns 116*a*, 116*b*, 116*c*, 116*d*, 116*e* of cells 312 and five rows 308*a*, 308*b*, 308*c*, 308*d*, 308*e* of cells 312. Although FIG. 3 illustrates a 5×5 array of cells 304, it should be appreciated that embodiments of the present disclosure can be implemented in an array of cells 304 having a variety of sizes. For instance, embodiments of the present disclosure may be used in an array of cells 304 that are 1×3, 1×5, 3×3, 3×5, 5×3, 7×3, 10×5, 10×10, etc. The example layout of the array of cells 304 should not be construed as limiting embodiments of the present disclosure.

As can be seen in FIG. 3, each cell 312 in the array of cells 304 may be populated with a single game symbol 318. In other words, after the game instruction set 220 has applied a random number generator 232 to determine game symbol 318 placement throughout the array of cells 304, there will be a 1:1 correlation of game symbols 318 to cells 312. Each column 116*a*, 116*b*, 116*c*, 116*d*, 116*e* or row 308*a*, 308*b*, 308*c*, 308*d*, 308*e* may also be referred to as a reel 116, particularly in the event that the game instruction set 220 provides a slot game. If a slot game is implemented, then the reels 116 (e.g., in video form) are spun (e.g., virtually) and their final position after the spin is determined, at least in part, with assistance of the random number generator 232. While alphabetical and numerical game symbols are depicted, it is to be understood that any type of game symbol may occupy a cell. In some embodiments for example, a game symbol 318 may correspond to an absence of a game symbol or a blank game symbol. This blank game symbol may correspond to a game symbol in a cell 312 having no value.

In some embodiments, payouts or other predetermined game outcomes (e.g., bonus spin opportunities, prize wins, cash wins, re-spin bonus plays, game symbol removal, etc.) may be determined based on a game symbol combination that falls on a payline 120 that was subject to a wager prior to the spin. In some embodiments, a plurality of the paylines 120 may be selected for “play” prior to a spin, meaning that any payline 120 selected for “play” will be evaluated for a predetermined game symbol combination, or distribution of game symbols 318. Examples of a distribution of game symbols 318 may include, but are in no way limited to, at least one of the distribution [A; 1; E; 5; D] associated with the first row 308*a*, the distribution [B; 2; F; 6; E] associated with the second row 308*b*, the distribution [C; 3; G; 7; F] associated with the third row 308*c*, the distribution [D; 4; H; 8; G] associated with the fourth row 308*d*, the distribution [E; 5; I; 9; H] associated with the fifth row 308*e*, and/or reverse distributions of the same. Additionally or alternatively, the distribution of game symbols 318 may include, but are in no way limited to, a distribution of game symbols 318 in an order along one or more of the vertical lines of cells 312 associated with the columns 116*a*-116*e* (e.g., the distribution [A; B; C; D; E], the distribution [1; 2; 3; 4; 5], etc., and/or reverse distributions of the same). In some embodiments, the distribution of game symbols 318 may include, but are in no way limited to, a distribution of game symbols 318 in an order along one or more of the cells 312 having a payline 120 running therethrough (e.g., the first diagonal payline distribution [A; 2; G; 8; H], the second diagonal payline distribution [E; 4; G; 8; D], the first vertical payline distribution [A; B; C; D; E], the first horizontal payline distribution [C; 3; G; 7; F], etc., and/or reverse distributions of the same). In one embodiment, the distribution of game symbols may comprise all distributions of game symbols associated with each row 308*a*-308*e* and/or column 116*a*-116*e*. A selected payline 120 may also correspond to the payline 120 that is evaluated after game symbols 318 have been subjected to a game symbol removal game symbol operation by the game symbol removal instruction set 228. In some embodiments, however, it may be possible to switch or select more paylines 120 for evaluation after a spin has completed, but before a subsequent play operation (e.g., re-spin, etc.) has been performed. The addition of more paylines 120 after the original spin but prior to the subsequent play operation may require the user to provide more credits to the game instruction set 220 as part of enabling evaluation over more paylines 120. Although shown having four different linear paylines 120 (e.g., horizontal, vertical, diagonal, etc.), one or more paylines 120 may be associated with cells 312 in any shape the array of cells 304. In one embodiment, a payline 120 may run through a single row 308*a*-308*e* of the array of cells 304 (e.g., first row 308*a*, etc.). In some embodiments, a payline 120 may run through one or more columns 116*a*-116*e* in the array of cells 304. In any event, embodiments of the present disclosure are not limited to the position and/or shape of the paylines 120 shown in FIGS. 3-4.

Referring now to FIGS. 4-12, an illustrative game play distribution that can be performed by the game instruction set 220 and the game symbol removal instruction set 228 will be described in accordance with at least some embodiments of the present disclosure. In some embodiments, FIGS. 4-12 illustrate various presentations that are caused to be rendered by a display screen 104 of a computational device 100.

Figure 4:
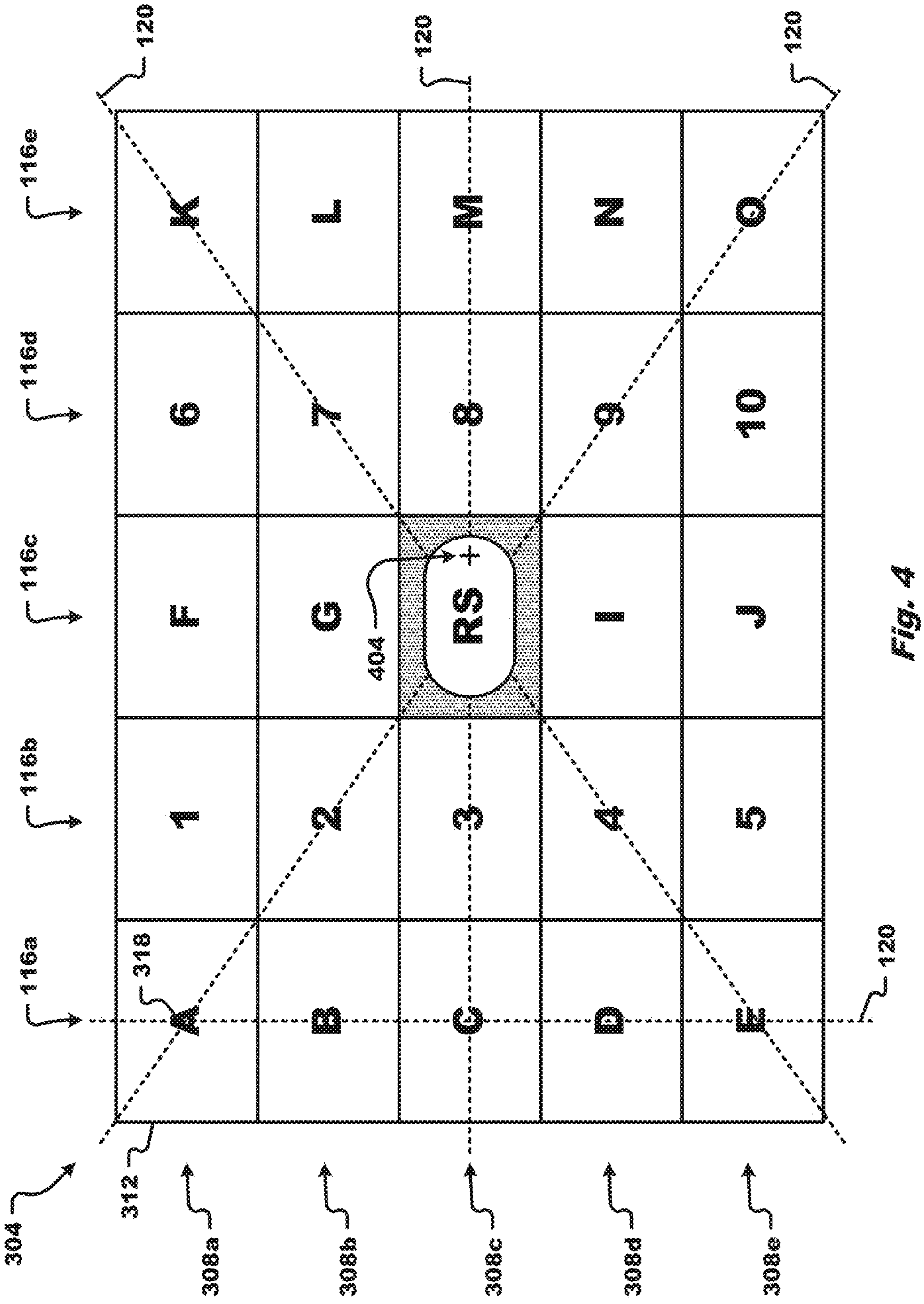
FIG. 4 illustrates an exemplary output of the computational gaming device showing a first distribution of game symbols comprising a bonus game symbol feature associated with a particular game symbol in the array of cells that are rendered as a result of a play of the game.

In the example of FIG. 4, the original play, or spin, and placement of game symbols 318 throughout the array of cells 304 is determined by the game instruction set 220 working in cooperation with the random number generator 232. Stated another way, each cell 312 in the array of cells 304 is populated with a respective discrete game symbol 318 that is rendered by the display screen 104 of the computational device 100. The game symbols 318 may be randomly assigned to each cell 312 in the array of cells 304. The position of game symbols 318 in the array of cells 304 may be evaluated by the game instruction set 220 to determine if a predetermined game outcome has occurred (e.g., a wager has resulted in a win or prize, a removable game symbol is available, etc.). For instance, the game instruction set 220 may determine if a distribution of game symbols 318 along a payline 120 corresponds to a winning game outcome, etc. The distribution of game symbols 318 may correspond to an order of game symbols 318 in a particular distribution as defined by the rules of the game. In one embodiment, a winning outcome for a distribution of game symbols 318 may require at least one of a first game symbol to appear in the first column 116*a* of a payline 120, a second game symbol to appear in the second column 116*b* of the same payline 120, a third game symbol to appear in the third column 116*c* of the same payline 120, a fourth game symbol to appear in the fourth column 116*d* of the same payline 120, and a fifth game symbol to appear in the fifth column 116*e* of the same payline. Depending on the rules of the game, these game symbols 318 may be required to be the same, for example, forming a match between two or more cells 312 in the distribution of game symbols 318.

In FIG. 4, a bonus game symbol ("RS") symbol 404 is shown to have landed in a cell 312. Specifically, the RS symbol 404 is shown to have landed in the cell 312 that resides at the intersection of the third row 308*c* and the third column 116*c*. The game instruction set 220 and/or the game symbol removal instruction set 228 in conjunction with the random number generator 232 randomly generated a RS symbol 404 that triggers a bonus feature for the player to select a set of game symbols to be removed from one or more rows 308*a-e* and/or columns 116*a-e* of the array of cells 304. In some embodiments, the RS symbol 404 may be made available in response to a previous game play, a wager amount, a historical game play, etc. The placement and position, or cell 312, associated with the RS symbol 404 in the array of cells 304 may be randomly determined (e.g., via the game instruction set 220 and/or the game symbol removal instruction set 228 executing instructions in conjunction with the random number generator 232).

While FIG. 4 depicts appearance of an RS symbol 404 in a payline 120 of the array of cells as a trigger for invoking the game symbol removal instruction set 228, any other trigger may be employed. For example, the game symbol removal feature can be implemented as a bonus feature dependent upon a predetermined outcome of the game that does not involve an RS symbol 404 (e.g., a particular order or distribution of game symbol types such as a Hit 3 BN or Scatter) or upon some other criterion, such as a wager or side wager of the player, a credit balance of a player, and the like.

In the bonus feature, the type of the removable game symbol eligible for inclusion in the set of game symbols may correspond to any type of particular game symbol 318 used in the game. In one embodiment, the removable game symbols in the set of game symbols may correspond to a bonus game symbol type, a high-probability winning game symbol type (e.g., cherries, diamonds, multipliers, etc.), and/or some other game symbol that may increase the player's chances of winning on a subsequent play where the removable game symbol is removed from possible inclusion in a particular cell 312 in the array of cells 304. Stated differently, a removed game symbol is not eligible for inclusion in a predetermined set of cells of the array of cells 304, such as in any cell of one or more rows or columns of the array of cells from which the game symbol has been removed.

When a player is eligible to remove a set of game symbols from all or a portion of the array of cells, the game symbol removal operation can allow a player of the gaming device a game symbol removal feature that provides his or her input regarding the set of game symbols to be removed from the array of cells of the game (e.g., one or more reels of a slot game) prior to a next play of the game (e.g., a next spin of the reels of the slot game). The player input can be provided in many different ways, such as in the form of an output of another game (e.g., a wheel game or a match game) and/or a random or pseudorandom number generator based on the game symbols appearing in the array of cells (e.g., on a payline 120).

Figure 5:
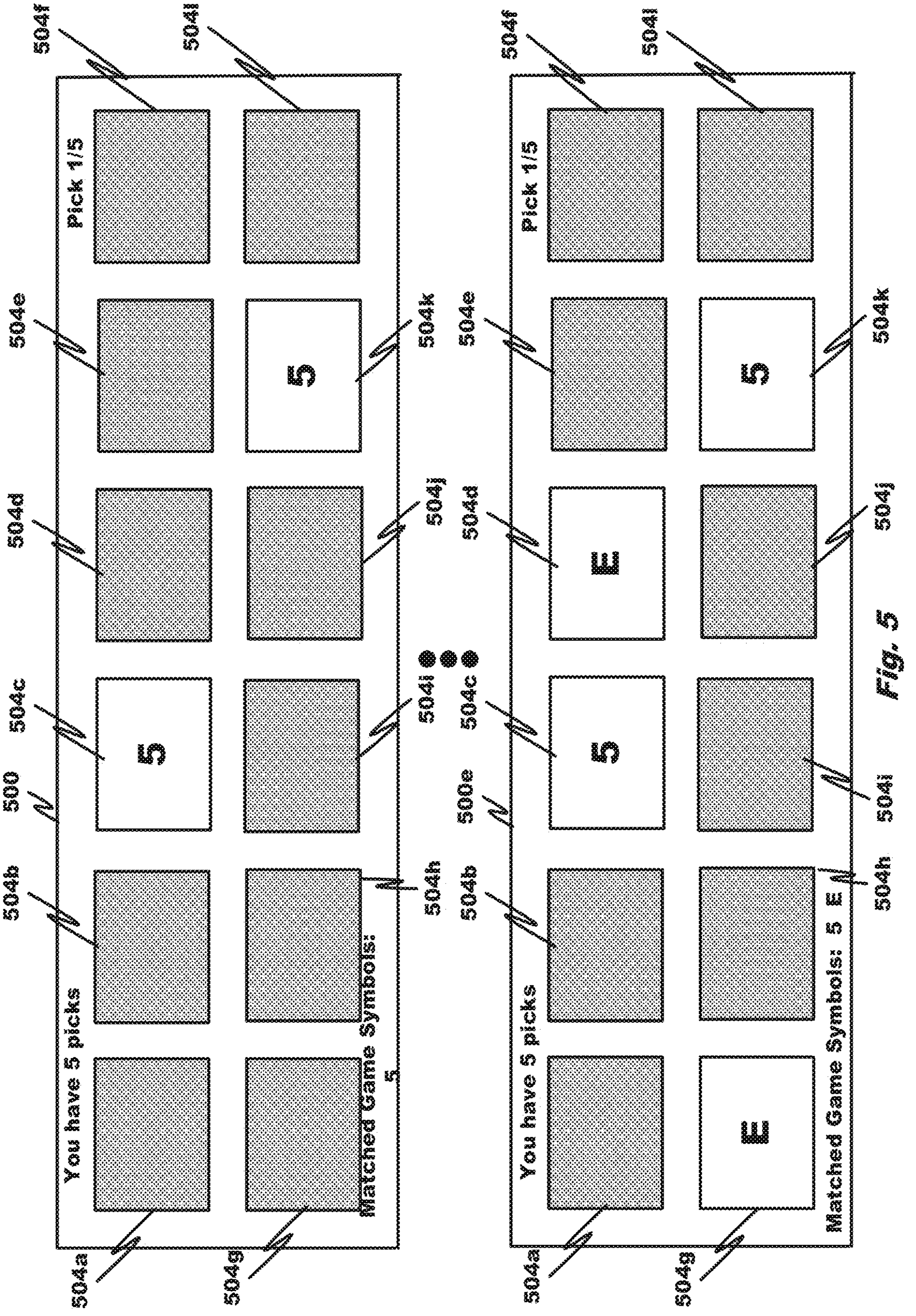
FIG. 5 illustrates an exemplary game symbol match game that determines a set of game symbols in the set of game symbols to be removed from a game.

An example of a match game to determine the removable game symbols in the set of game symbols is shown in FIG. 5. With reference to FIG. 5, a series of virtual playing cards 504*a-l* are rendered face-down on the display 104. The player has a specified number of attempts to turn over and match cards (e.g., two cards per attempt). While FIG. 5 shows a series of five attempts, any number of attempts may be provided depending on the type of bonus feature trigger. Different types of bonus feature triggers may, for example, provide different numbers of attempts. After each attempt, matched cards can remain turned up while unmatched cards can remain face-down or be turned face-down. The remaining cards can be rearranged. FIG. 5 shows that the player has matched the game symbol "5" in the first attempt and in a subsequent attempt the game symbol "E". While a 2×6 array of cards is depicted, it is to be understood that any number of cards may be provided to the player. In other configurations, the matched cards are removed from the array and replaced with new face-down cards, which may be rearranged to make matching of the cards more difficult.

Figure 6A:
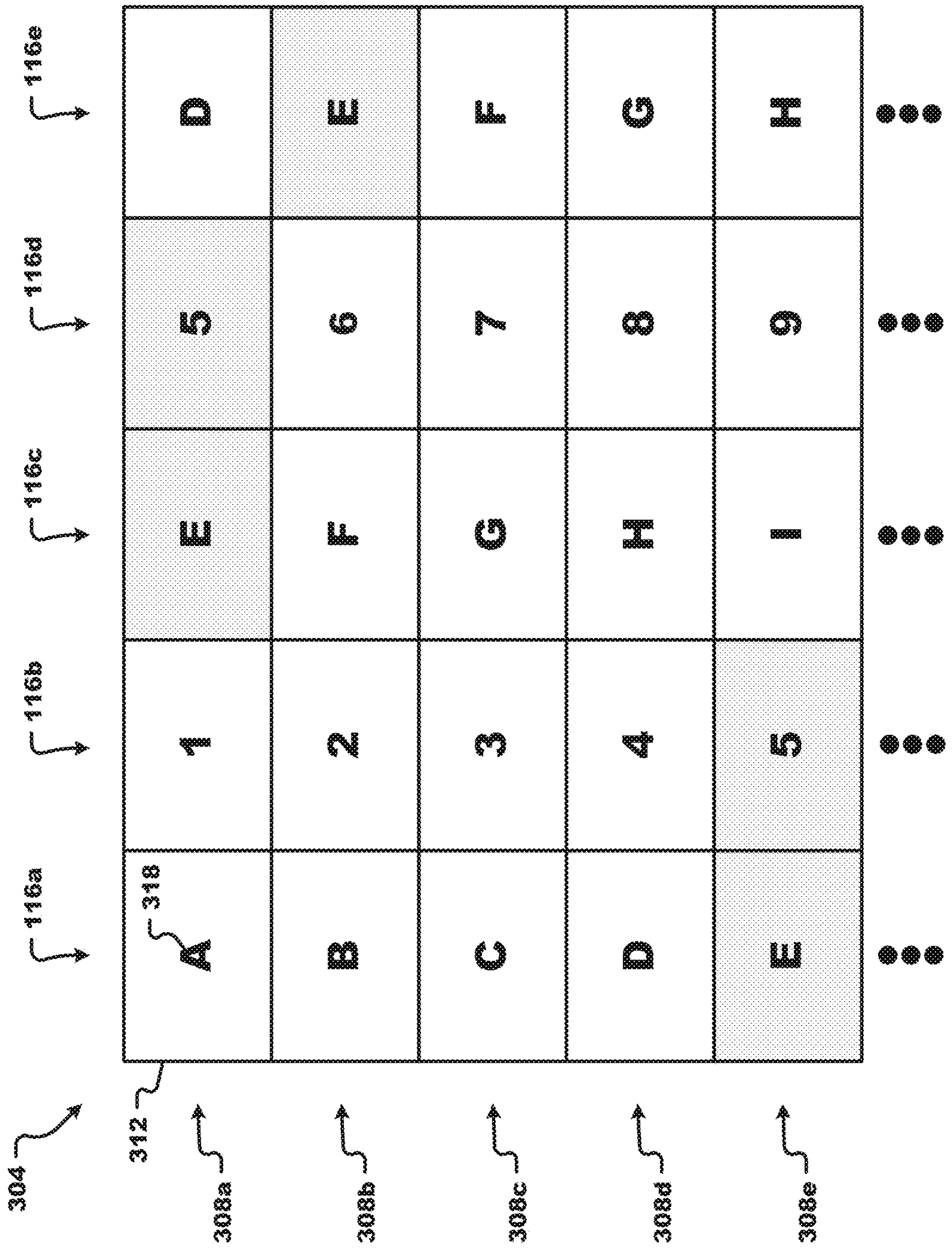
FIG. 6A illustrates an exemplary array of cells before removal of the matched game symbols.
Figure 6B:
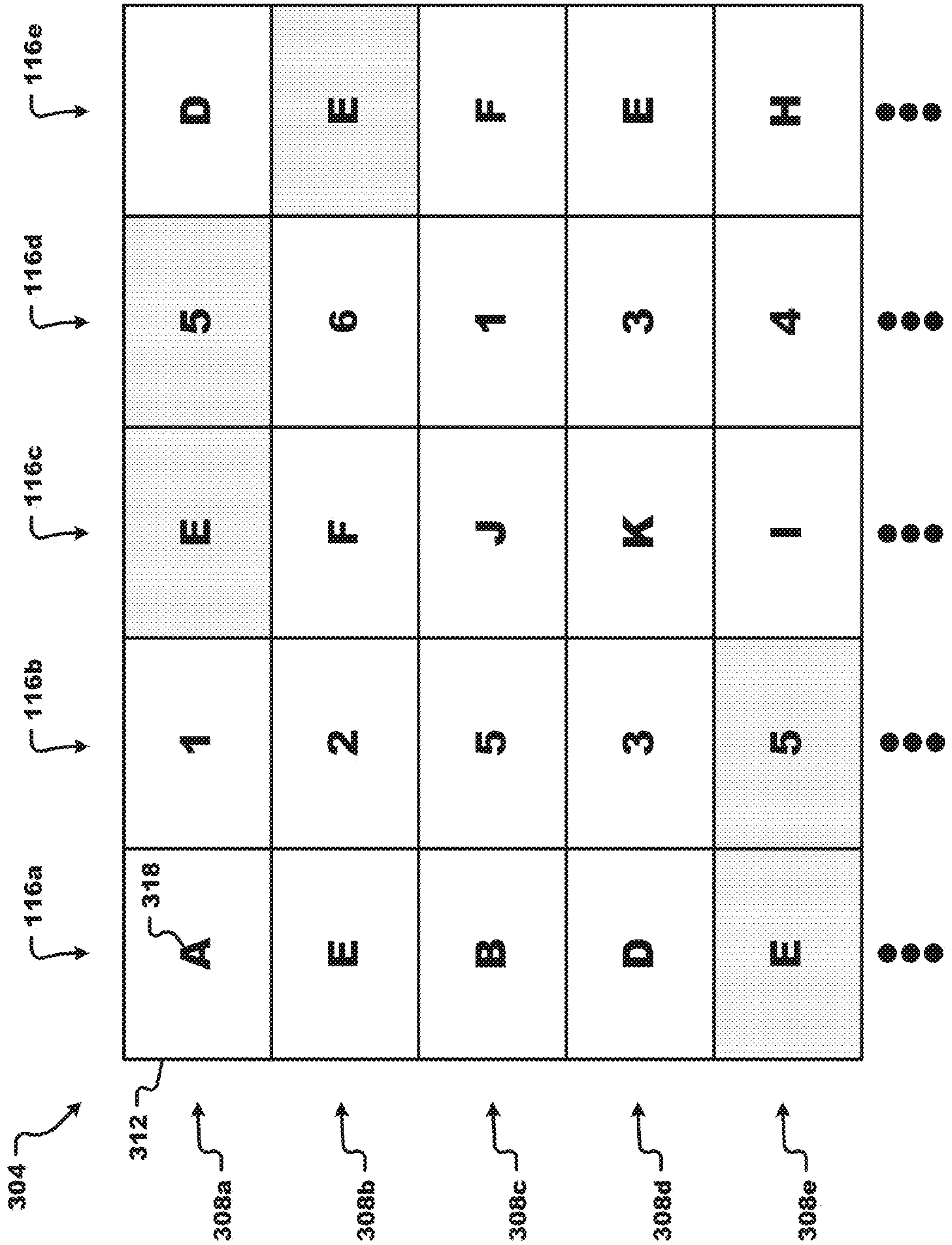
FIG. 6B illustrates an exemplary array of cells before removal of the matched game symbols.

Continuing with the example, the removable game symbols in the set of game symbols comprises "5" and "E"; FIG. 6A depicts the array of cells of FIG. 3 with the game symbols in the set of game symbols to be removed highlighted; and FIG. 6B depicts the array of cells of FIGS. 3 and 6A modified to remove occurrences of the highlighted game symbols from the cells of the array. Thus, columns 116*a*, 116*c*, and 116*e* have been modified to remove the game symbol "E", and columns 116*b* and 116*d to remove the game symbol* "5".

Game symbol removal can be thought of in at least two ways. First, the number and/or of types of game symbols that are eligible to be output by the random number generator to each and any cell of the array for game play of the modified array is less than the number and/or types of game symbols that are eligible to be output for game play of the unmodified array. Second, the number and/or types of game symbols that are eligible to be output by the random number generator for a spin of any full row 308*a-e* or full column 116*a-e* is less than the number and/or types of game symbols that are eligible to be output for a spin of the full row 308*a-e* or full column 116*a-e* of the unmodified array.

Figure 7A:
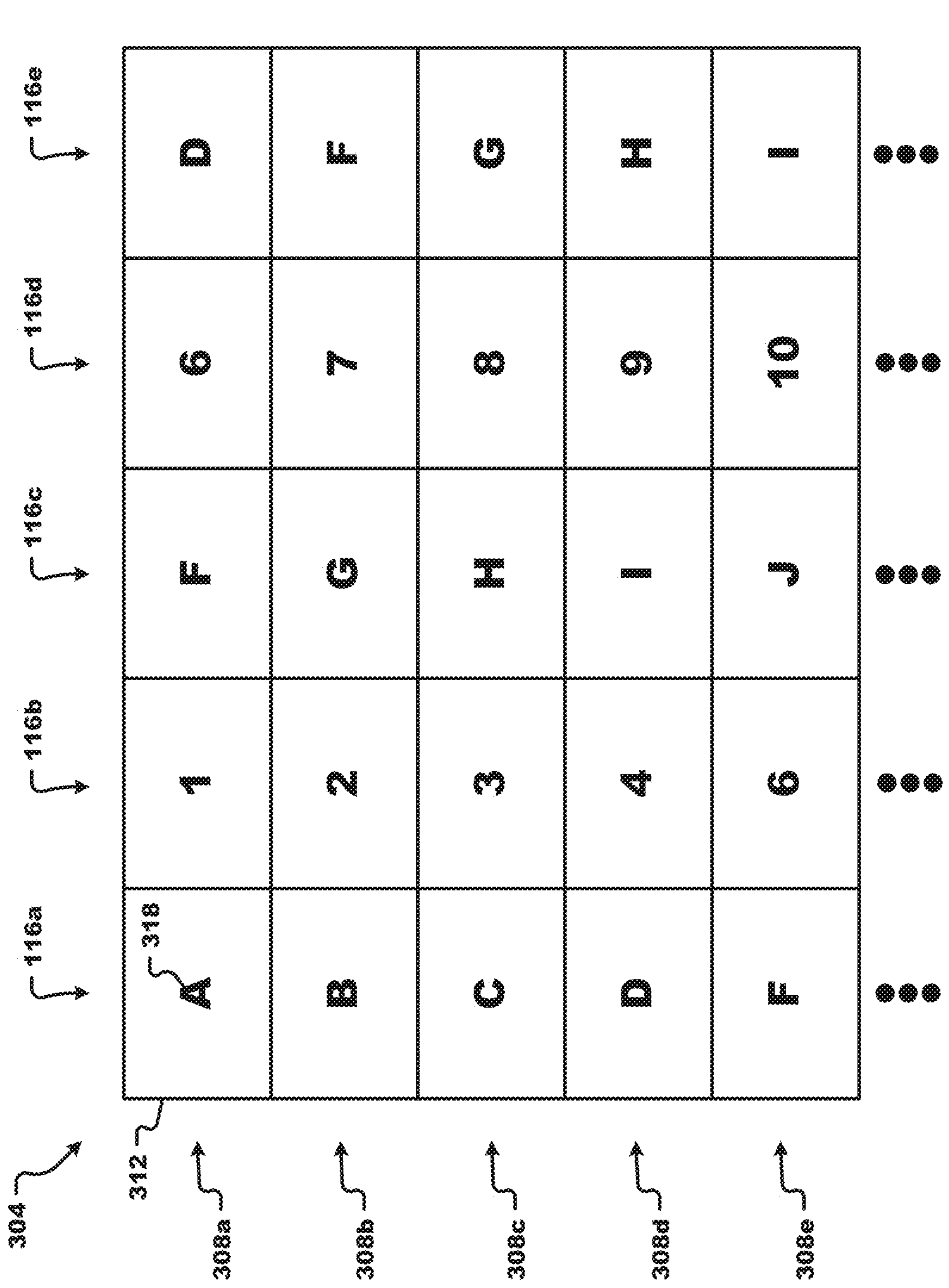
FIG. 7A illustrates the exemplary array of cells of FIG. 6A after removal of the matched game symbols.

Referring to FIG. 7A, the modified array of cells, or reel in the second configuration, is depicted. As can be seen from FIG. 7A, the game symbols "E" and "5" are absent from the array of cells after re-spin of the modified array. The likelihood of a winning outcome taken along any of the paylines 120 of FIG. 3 is higher than for the unmodified array of FIG. 3 as there are fewer game symbols that are eligible to occupy, as random number generator output, any cell of the array. Stated differently, the relative weights of each of the remaining game symbols towards an outcome for a given cell is higher for the modified array of FIG. 6B than for the unmodified array of FIG. 3.

Figure 7B:
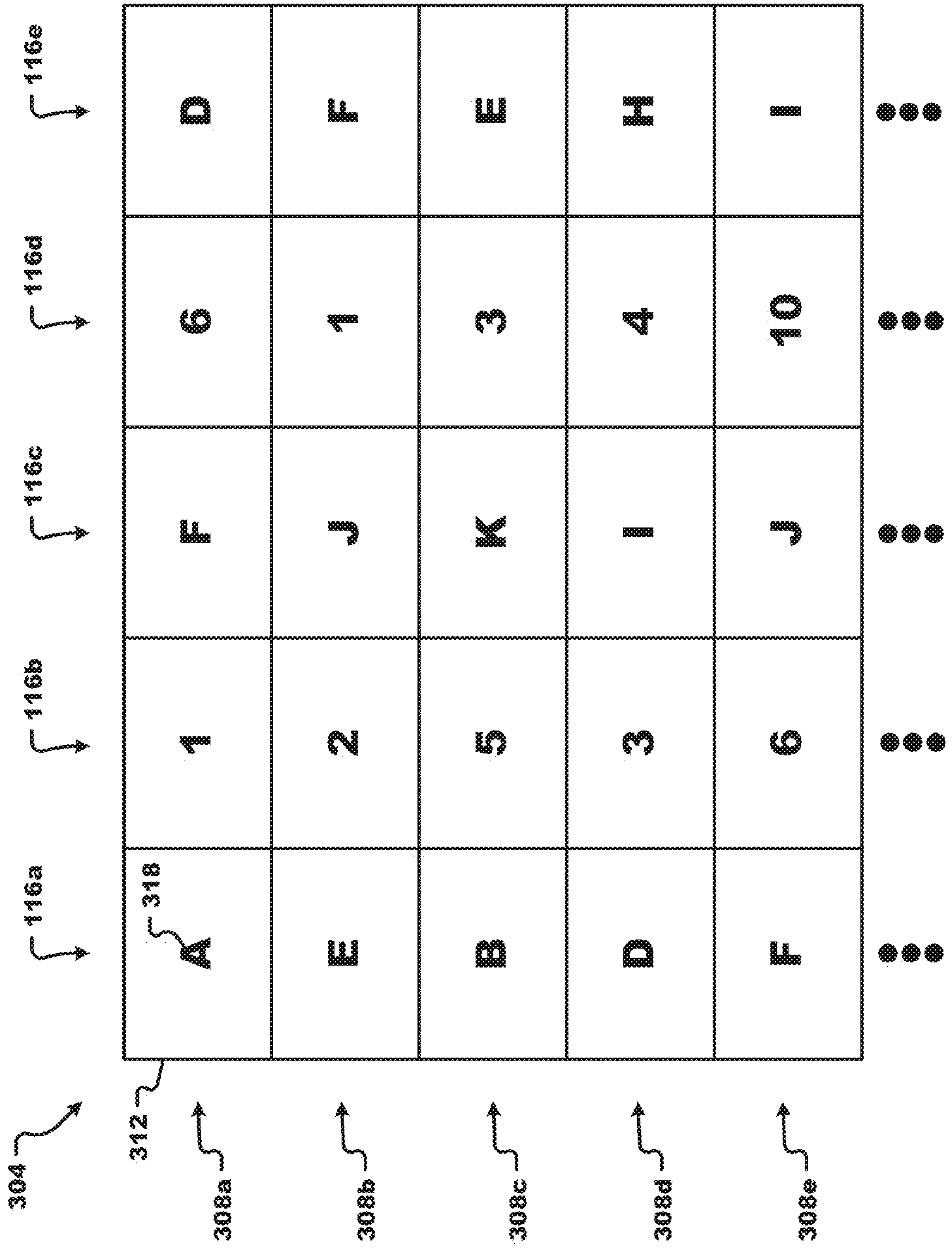
FIG. 7B illustrates the exemplary array of cells of FIG. 6B after removal of the matched game symbols.

While FIGS. 6B and 7A depict an array of cells modified by removing all occurrences of a given type of game symbol (e.g., "E" and "5"), FIG. 7B depicts an array after game play from which only a portion of the given types of game symbols have been removed. The game symbols "E" and "5" are in the modified array but the number of occurrences of "E" and "5" in the modified array is less than the number of occurrences of "E" and "5" in the unmodified array, respectively.

Figure 8:
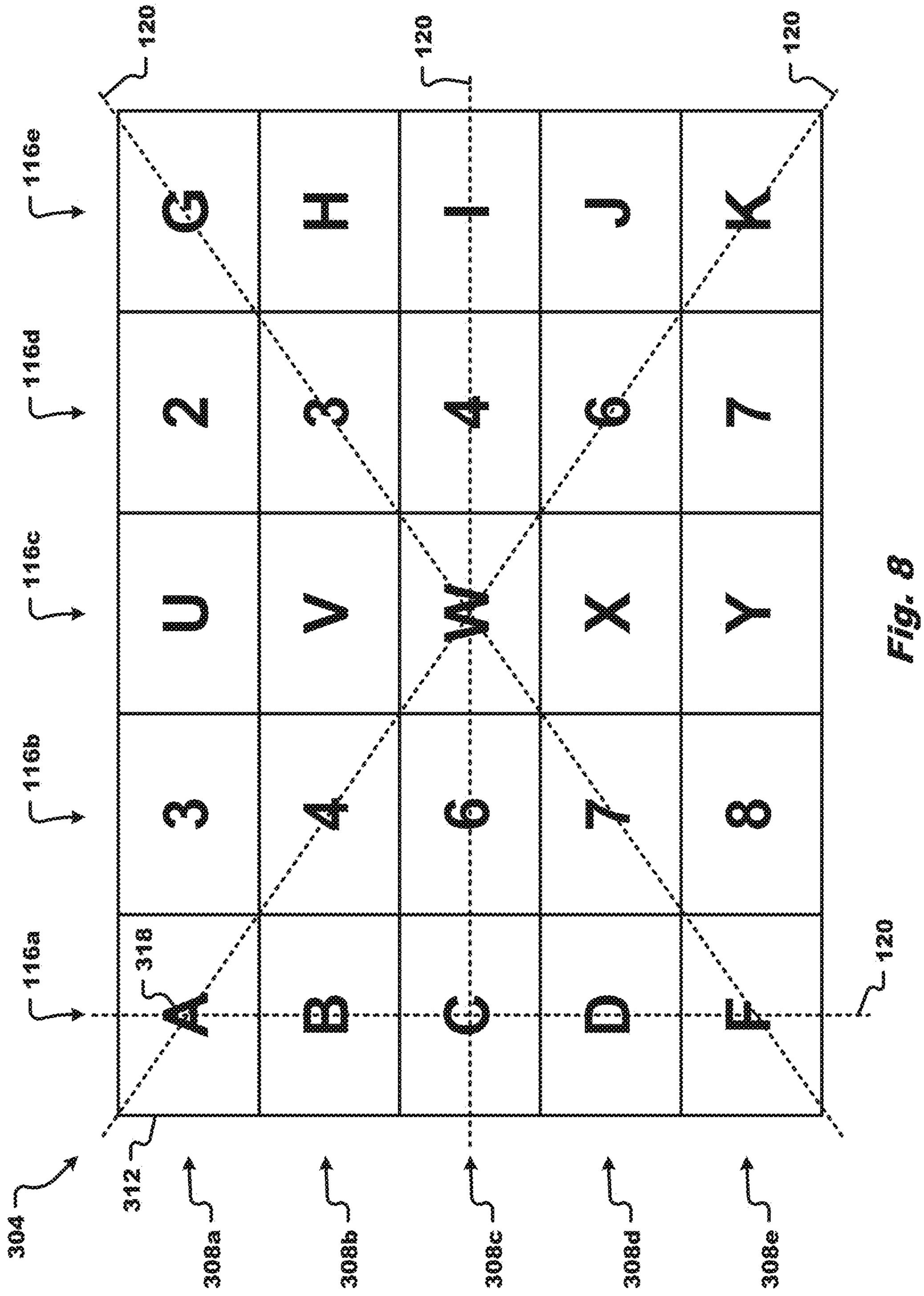
FIG. 8 illustrates an exemplary output of the computational gaming device after removal of the matched game symbols.

FIG. 8 depicts an array of cells modified by removing all occurrences of "E" and "5" after a further spin of the array of the cells. The various paylines 120 are depicted. As noted, along any payline 120, the likelihood of the player receiving a winning outcome is higher for the modified array when compared to the modified array.

Figure 9:
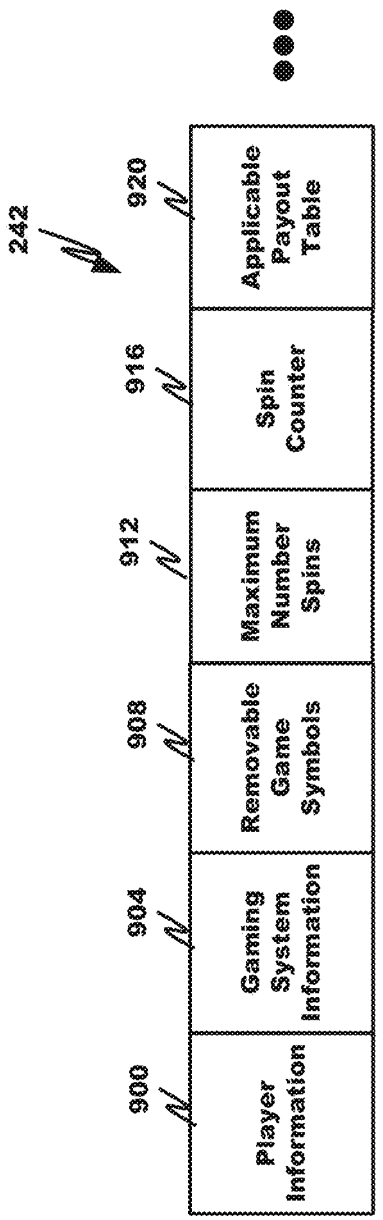
FIG. 9 illustrates an exemplary set of game symbol removal data structures.

Referring to FIG. 9, a set of game symbol removal data structures 242 is depicted. The set of game symbol removal data structures 242 can be maintained by the game instruction set 220 and/or game symbol removal instruction set 228. The set of game symbol removal data structures 242 comprises player information 900, gaming system information 904, removable game symbol(s) in the set of one or more game symbols 908, maximum number of spins 912 for the modified array of cells, spin counter 916, and applicable pay table 920.

The player information field 900 may be used to store any type of information that identifies a player. In some embodiments, the player information field 900 may store one or more of username information for a player, contact information for the player (such as email address, phone number, social website webpage universal resource locator, and the like), password information for a player account, player status information, accommodations associated with the player, and any other type of customer service management data that may be stored with respect to a player.

The gaming system information field 904 may be used to store any type of information that identifies a gaming system. In some embodiments, the gaming system information field 904 comprises one or more of a unique identifier of a gaming system in use by the player, such as a serial number, MAC, IP or other type of unique electronic address, and the like.

The removable game symbols field 908 may be used to store the game symbol(s) in the set of game symbols to be removed from the array of cells. In the example above, the removable game symbols field 908 would store the game symbols "E" and "5".

The maximum number of spins field 912 may be used to store the maximum number of spins or game plays to which the player is entitled with the modified array of cells.

The spin counter field 916 may be used to store a current number of spins taken or spins remaining with the modified array of cells. The spin counter value stored in the spin counter field 916 may start at the maximum number of spins field 912 value and be decremented to zero or start at zero and be incremented to the maximum number of spins field 912 value.

The applicable payout table field 920 may be used to store a description, or link, to the appropriate payout table to be used to convert a game outcome to player earnings. The increase in likelihood of a winning outcome may necessitate a different payout table for different numbers and types of removed game symbols.

Figure 10:
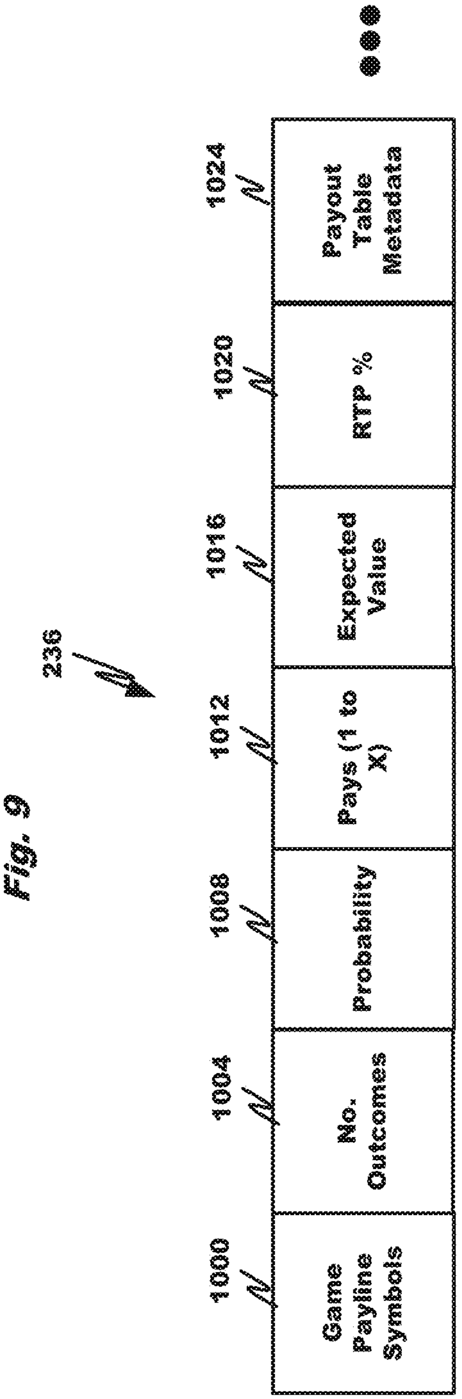
FIG. 10 illustrates an exemplary payout table in accordance with embodiments of the present disclosure.

With reference to FIG. 10, an illustrative payout table 236 is depicted. The payout table 236 comprises a number of columns including game payline symbol 1000, number of outcomes 1004, probability 1008, pays (1 to X) 1012, expected value 1016, return to player ("RTP") percentage 1020, and payout table metadata 1024. In the payout table 236, the game payline symbols 1000 corresponds to the winning combinations of game symbols on the payline, the outcome column 1004 shows the number of potential outcomes corresponding to each of the winning combinations of game symbols, the probability column 1008 shows the probability of either the random number generator producing a potential outcome in the selected winning game symbol combination, the pays (1 to x) column 1012 shows the multiplier applied to the wager of the player for the selected winning game symbol combination, the expected value column 1016 shows the expected value corresponding to the selected winning game symbol combination (the expected value is typically the weighted average of the possible values of a random variable, with weights given by their respective theoretical probabilities) for a winning result, and the return to player percentage (RTP) column 1020 shows how much money bet on a wager will be returned to a player, and a house edge column (not shown) can be included to show how much money bet on a wager will be returned to the house (the sum of the RTP and house edge for any side bet is 1 or 100%). As will be appreciated, RTP and house edge are calculated over time, and the total of each column is the average RTP or house edge, respectively, over time.

The payout table metadata 1024 describes when the payout table is to be employed to determine player winnings. For example, the payout table metadata 1024 can include the number and/or types of removable game symbol(s) in the set of one or more game symbols removed from the array and the portion of the array (e.g., reels) from which the removable game symbols are removed. One of ordinary skill in the gaming art will appreciate that other types of payout tables can be employed depending on the application.

Figure 11:
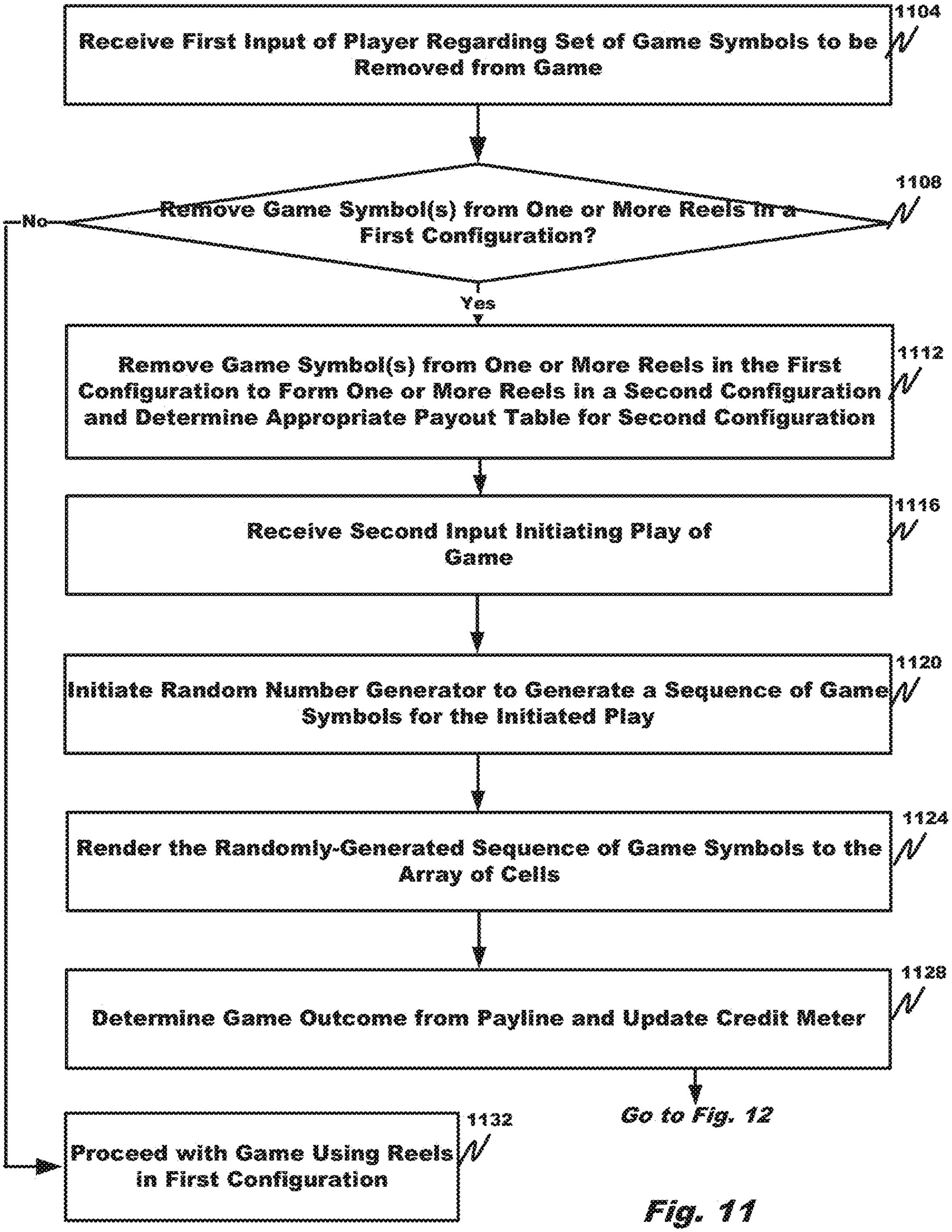
FIG. 11 is a flow diagram of an example process for enabling a game symbol removal operation in a game.

With reference now to FIG. 11, a flow diagram depicting a method of an example process for enabling a game symbol removal operation in a game is shown in accordance with embodiments of the present disclosure. The methods described herein may be run as a set of instructions on a computational device 100 and/or some other server in communication with the computational device 100. In some embodiments, the set of instructions may be part of an application installed on the computational device 100.

In any event, the method begins by determining that first input of a player regarding a set of game symbols to be removed from a game has been received (step 1104). As noted above in connection with FIG. 5, the input can be via a game of skill or chance, such as a matched game, wheel game, slot game, or other game.

As noted above in connection with FIG. 4 in some embodiments, the game instruction set 220 and/or the game symbol removal instruction set 228 may leverage the random number generator 232, as first player input, to determine a particular game symbol (RS symbol 404) in the array of cells 304 that is associated with a game symbol removal operation. The game symbols 318, including the particular game symbol associated with the game symbol removal operation, are rendered in the array of cells 304 via the display screen 104 of the computational device 100.

In some embodiments, the game instruction set 220 and/or the game symbol removal instruction set 228 may leverage the random number generator 232, as first player input, to determine directly a removable game symbol in the set of game symbols based on the array of cells 304 that is associated with a game symbol removal operation. In this embodiment, the removable game symbols can be part of the payline output during play (e.g., prior spin) of the game.

The method next determines whether or not the input requires removal of game symbol(s) from one or more cells of the array, or from reels in a first configuration (decision diamond 1108). The input may, for example, indicate that the player was unable to receive any removable game symbols in a game or skill or chance. The input may alternatively indicate which game symbols that the player was able to obtain removable game symbol(s) in the game of skill or chance.

When the first input does not require a removable game symbol to be removed in the game symbol removal operation, the method proceeds with the game using the unmodified array or reel in the first configuration (step 1132).

When the player was successful in obtaining removable game symbols in the first input, the method continues by removing the game symbol(s) from one or more sets of cells of the unmodified array, or from one or more reels in the first configuration, to form a modified array, or one or more reels in a second configuration (step 1112). The method may optionally determine an appropriate payout table for the second configuration of the reel.

The method continues by receiving second input of the player to initiate play of the game using the modified array (step 1116). This step may occur in response to the player selecting a predetermined button or providing an input via some other input device 108, inserting coins, cash, tickets, vouchers, etc., or performing some other action at the computational device 100 that indicates a desire to begin game play. In one embodiment, the first input may correspond to an input provided by the player via an input device 108. For example, the first input may correspond to a button press, a touch of a screen, a lever actuation, a gesture, and/or some other physical input provided by the player. The game may correspond to a reel-spin game, a matching game, and/or any other game having a distribution of game symbols 318 arranged in a presentation order.

In response to receiving the second input, the method continues by generating a distribution of game symbols for the game play (step 1120). In some embodiments, the game instruction set 220 initiating the game play (e.g., a reel spin) may leverage the random number generator 232 to determine a final position of game symbols 318 to be rendered in the array of cells 304 (step 1124). The game may be arranged as an array of cells 304 having a specific presentation order that defines a specific position of each cell 312 in the array of cells 304 relative to one another. This randomly-generated distribution of game symbols 318 is rendered to the array of cells 304 such that each cell 312 in the array of cells 304 comprises a discrete game symbol 318 in the first distribution of game symbols 318 (see FIGS. 7A, 7B, and 8). A discrete game symbol may comprise any game symbol, including a blank game symbol, associated with the game that has been randomly generated for a specific cell 312 in the array of cells 304 from a predetermined group of game symbols 318.

Next, the method proceeds by determining the game outcome from the payline 120 and payout table 236 and updates the wager credit meter 224 to reflect the earnings of the player (step 1128).

Figure 12:
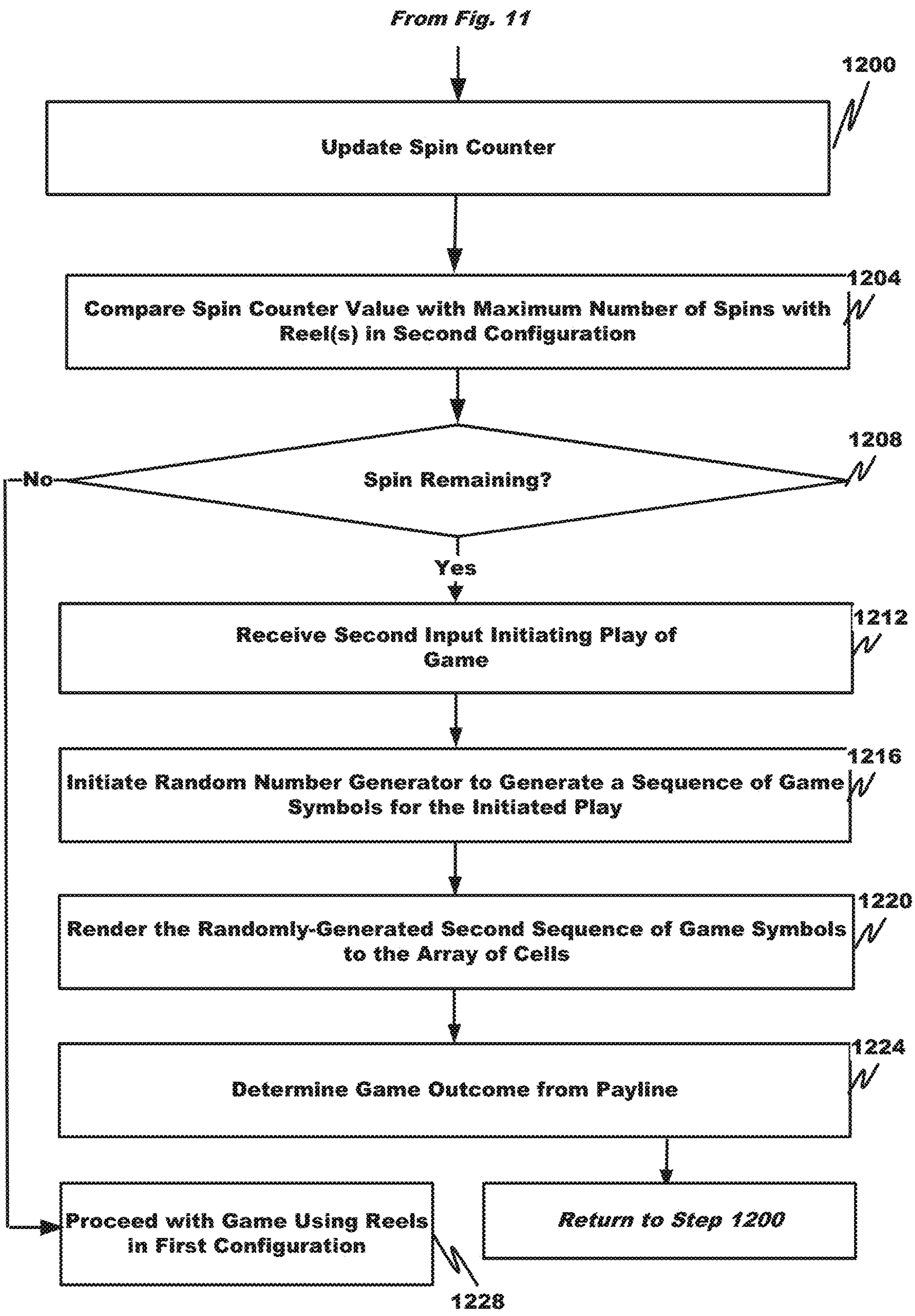
FIG. 12 is a flow diagram of an example process for enabling a game symbol removal operation in a game.

Referring to FIG. 12, the method may then update the spin counter (step 1200), compare the spin counter with the maximum number of spins with reel(s) in the second configuration (step 1204), and determine whether or not a spin is remaining (decision diamond 1208).

When no spin remains, the method proceeds with the game using the unmodified array of cells or reels in the first configuration (step 1228).

When a spin remains, the method continues by receiving second input of the player to initiate play of the game using the modified array (step 1212).

In response to receiving the second input, the method continues by generating a distribution of game symbols for the game play (step 1216) as set forth above.

Next, the method proceeds by determining the game outcome from the payline 120 and payout table 236 and updates the wager credit meter 224 to reflect the earnings of the player (step 1224).

Steps 1116-1208 can be repeated using the reel(s) in the second configuration until the spin counter indicates that no further spins remain.

A number of variations and modifications of the disclosure can be used. It would be possible to provide for some features of the disclosure without providing others.

The present disclosure contemplates a variety of different gaming systems each having one or more of a plurality of different features, attributes, or characteristics. A "gaming system" as used herein refers to various configurations of: (a) one or more central servers, central controllers, or remote hosts; (b) one or more electronic gaming machines such as those located on a casino floor; and/or (c) one or more personal gaming devices, such as desktop computers, laptop computers, tablet computers or computing devices, personal digital assistants, mobile phones, and other mobile computing devices. Moreover, an EGM as used herein refers to any suitable electronic gaming machine which enables a player to play a game (including but not limited to a game of chance, a game of skill, and/or a game of partial skill) to potentially win one or more awards, wherein the EGM comprises, but is not limited to: a slot machine, a video poker machine, a video lottery terminal, a terminal associated with an electronic table game, a video keno machine, a video bingo machine located on a casino floor, a sports betting terminal, or a kiosk, such as a sports betting kiosk.

In various embodiments, the gaming system of the present disclosure includes: (a) one or more electronic gaming machines in combination with one or more central servers, central controllers, or remote hosts; (b) one or more personal gaming devices in combination with one or more central servers, central controllers, or remote hosts; (c) one or more personal gaming devices in combination with one or more electronic gaming machines; (d) one or more personal gaming devices, one or more electronic gaming machines, and one or more central servers, central controllers, or remote hosts in combination with one another; (e) a single electronic gaming machine; (f) a plurality of electronic gaming machines in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity and unless specifically stated otherwise, "EGM" as used herein represents one EGM or a plurality of EGMs, "personal gaming device" as used herein represents one personal gaming device or a plurality of personal gaming devices, and "central server, central controller, or remote host" as used herein represents one central server, central controller, or remote host or a plurality of central servers, central controllers, or remote hosts.

As noted above, in various embodiments, the gaming system includes an EGM (or personal gaming device) in combination with a central server, central controller, or remote host. In such embodiments, the EGM (or personal gaming device) is configured to communicate with the central server, central controller, or remote host through a data network or remote communication link. In certain such embodiments, the EGM (or personal gaming device) is configured to communicate with another EGM (or personal gaming device) through the same data network or remote communication link or through a different data network or remote communication link. For example, the gaming system includes a plurality of EGMs that are each configured to communicate with a central server, central controller, or remote host through a data network.

In certain embodiments in which the gaming system includes an EGM (or personal gaming device) in combination with a central server, central controller, or remote host, the central server, central controller, or remote host is any suitable computing device (such as a server) that includes at least one processor and at least one memory device or data storage device. As further described herein, the EGM (or personal gaming device) includes at least one EGM (or personal gaming device) processor configured to transmit and receive data or signals representing events, messages, commands, or any other suitable information between the EGM (or personal gaming device) and the central server, central controller, or remote host. The at least one processor of that EGM (or personal gaming device) is configured to execute the events, messages, or commands represented by such data or signals in conjunction with the operation of the EGM (or personal gaming device). Moreover, the at least one processor of the central server, central controller, or remote host is configured to transmit and receive data or signals representing events, messages, commands, or any other suitable information between the central server, central controller, or remote host and the EGM (or personal gaming device). The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM (or personal gaming device). Further, one, more than one, or each of the functions of the at least one processor of the EGM (or personal gaming device) may be performed by the at least one processor of the central server, central controller, or remote host.

In certain such embodiments, computerized instructions for controlling any games (such as any primary or base games and/or any secondary or bonus games) displayed by the EGM (or personal gaming device) are executed by the central server, central controller, or remote host. In such "thin client" embodiments, the central server, central controller, or remote host remotely controls any games (or other suitable interfaces) displayed by the EGM (or personal gaming device), and the EGM (or personal gaming device) is utilized to display such games (or suitable interfaces) and to receive one or more inputs or commands. In other such embodiments, computerized instructions for controlling any games displayed by the EGM (or personal gaming device) are communicated from the central server, central controller, or remote host to the EGM (or personal gaming device) and are stored in at least one memory device of the EGM (or personal gaming device). In such "thick client" embodiments, the at least one processor of the EGM (or personal gaming device) executes the computerized instructions to control any games (or other suitable interfaces) displayed by the EGM (or personal gaming device).

In various embodiments in which the gaming system includes a plurality of EGMs (or personal gaming devices), one or more of the EGMs (or personal gaming devices) are thin client EGMs (or personal gaming devices) and one or more of the EGMs (or personal gaming devices) are thick client EGMs (or personal gaming devices). In other embodiments in which the gaming system includes one or more EGMs (or personal gaming devices), certain functions of one or more of the EGMs (or personal gaming devices) are implemented in a thin client environment, and certain other functions of one or more of the EGMs (or personal gaming devices) are implemented in a thick client environment. In one such embodiment in which the gaming system includes an EGM (or personal gaming device) and a central server, central controller, or remote host, computerized instructions for controlling any primary or base games displayed by the EGM (or personal gaming device) are communicated from the central server, central controller, or remote host to the EGM (or personal gaming device) in a thick client configuration, and computerized instructions for controlling any secondary or bonus games or other functions displayed by the EGM (or personal gaming device) are executed by the central server, central controller, or remote host in a thin client configuration.

In certain embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include a local area network (LAN) in which the EGMs (or personal gaming devices) are located substantially proximate to one another and/or the central server, central controller, or remote host. In one example, the EGMs (or personal gaming devices) and the central server, central controller, or remote host are located in a gaming establishment or a portion of a gaming establishment.

In other embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include a wide area network (WAN) in which one or more of the EGMs (or personal gaming devices) are not necessarily located substantially proximate to another one of the EGMs (or personal gaming devices) and/or the central server, central controller, or remote host. For example, one or more of the EGMs (or personal gaming devices) are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs (or personal gaming devices) are located. In certain embodiments in which the communication network includes a WAN, the gaming system includes a central server, central controller, or remote host and an EGM (or personal gaming device) each located in a different gaming establishment in a same geographic area, such as a same city or a same state. Gaming systems in which the communication network includes a WAN are substantially identical to gaming systems in which the communication network includes a LAN, though the quantity of EGMs (or personal gaming devices) in such gaming systems may vary relative to one another.

In further embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include an internet (such as the Internet) or an intranet. In certain such embodiments, an Internet browser of the EGM (or personal gaming device) is usable to access an Internet game page from any location where an Internet connection is available. In one such embodiment, after the EGM (or personal gaming device) accesses the Internet game page, the central server, central controller, or remote host identifies a player before enabling that player to place any wagers on any plays of any wagering games. In one example, the central server, central controller, or remote host identifies the player by requiring a player account of the player to be logged into via an input of a unique player name and password combination assigned to the player. The central server, central controller, or remote host may, however, identify the player in any other suitable manner, such as by validating a player tracking identification number associated with the player; by reading a player tracking card or other smart card inserted into a card reader; by validating a unique player identification number associated with the player by the central server, central controller, or remote host; or by identifying the EGM (or personal gaming device), such as by identifying the MAC address or the IP address of the Internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the Internet browser of the EGM (or personal gaming device). Examples of implementations of Internet-based gaming are further described in U.S. Pat. No. 8,764,566, entitled "Internet Remote Game Server," and U.S. Pat. No. 8,147,334, entitled "Universal Game Server."

The central server, central controller, or remote host and the EGM (or personal gaming device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

As should be appreciated by one skilled in the art, aspects of the present disclosure have been illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure have been described herein with reference to flowchart illustrations and/or block diagrams of methods, apparatuses (systems) and computer program products according to embodiments of the disclosure. It should be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The invention is claimed as follows:

1. A gaming method, comprising:

generating, based on output of a random number generator, a first game outcome comprising a first game payline comprising a first configuration of a reel associated with a first payout table of plural payout tables, the first configuration of the reel comprising an array of cells comprising a first plurality of game symbols;

storing the first game outcome in a computer readable memory;

accessing, in the computer readable memory, the first payout table;

evaluating, with a processor, the first game outcome based on the first payout table to determine a first update to a credit meter and one or more game symbols eligible for removal from the first configuration of the reel;

based on the evaluating, updating, by the first update the credit meter;

based on the evaluating, determining, by the processor, a set of game symbols to be removed from the first plurality of game symbols in the first configuration of the reel;

mapping, by the processor, the set of game symbols against payout table metadata fields of plural payout tables to identify a second payout table, the payout table metadata fields each comprising a description of removed occurrences of one or more game symbols associated with a respective payout table, generating, based on further output of the random number generator, a second game outcome comprising a second game payline comprising a second configuration of the reel associated with a second payout table of the plural payout tables, wherein the array of cells in the second configuration of the reel comprises a second plurality of game symbols, wherein the generating removes one or more occurrences of a selected game symbol in the set of game symbols from the first configuration of the reel to form the second configuration of the reel, wherein the second configuration of the reel maintains game symbols in corresponding cells adjacent to a cell formerly occupied by the removed occurrence of the selected game symbol, and wherein, in the first configuration of the reel, a game symbol type of the selected game symbol has a first weight towards inclusion in the first game payline and, in the second configuration of the reel, a second weight towards inclusion in a second game payline, the first weight being less than the second weight;

storing the second game outcome in the computer readable memory;

evaluating, with the processor, the second game outcome to determine a second update to a credit meter based on the second payout table, wherein one or more of a number of outcomes field, probability field, pays (1 to X) field, expected value field, and return to player percentage field in the first and second payout tables are different to reflect corresponding removal of occurrences of one or more game symbols; and based on the evaluating, updating, by the second update, the credit meter.

2. The method of claim 1, wherein, in the generating, each cell in the second game payline is populated with a corresponding symbol in the second plurality of game symbols, wherein a number of game symbols on the reel in the first configuration of the reel is more than a number of game symbols on the reel in the second configuration of the reel, and wherein in the determining the set of game symbols to be removed from the first plurality of game symbols from the first configuration of the reel is determined as an outcome of a matching game initiated by a player.

3. The method of claim 1, wherein, in the first configuration of the reel, a second selected game symbol of the first plurality of game symbols has a first probability of being the first game payline and, in the second configuration of the reel, the second selected game symbol has a second probability of being the second game payline, the first probability being different than the second probability, wherein a game symbol type of the removed one or more occurrences of the selected game symbol is different than the game symbol type of the second selected game symbol, and further comprising:

receiving a wager from a player regarding the set of game symbols; and wherein in the determining the set of game symbols to be removed from the first plurality of game symbols from the first configuration of the reel is determined as an outcome of a wheel game initiated by a player.

4. The method of claim 1, wherein the game symbol type of the removed one or more occurrences of the selected game symbol in the set of game symbols is one of a standard reel game symbol, a scatter game symbol, a wild symbol, multiplier, and bonus game symbol and wherein the determining comprises:

determining, based on the first game payline, whether or not to receive first input of a player regarding the one or more game symbols eligible for removal from the first configuration of the reel and further comprising:

selecting, randomly based on a random number generator, the removed one or more occurrences of the selected game symbol in the set of game symbols;

adjusting a spin counter value in response to initiating spin of the reel in the second configuration of the reel to provide a first spin counter value;

comparing the first spin counter value to a predetermined value;

when the first spin counter value is different from the predetermined value, initiating, in response to input of a player, a further spin of the reel in the second configuration of the reel to produce a third slot game payline;

adjusting the first spin counter value in response to the further spin to provide a second spin counter value;

generating a display comprising a third slot game outcome from the second game payline;

comparing the second spin counter value to the predetermined value; and in response to the second spin counter value being the same as the predetermined value, returning the reel to the first configuration of the reel.

5. The method of claim 1, wherein the second payout table is associated with payout table metadata describing one of: a number of game symbols in the set of game symbols to be removed from the array of cells, a type of game symbols in the set of game symbols to be removed from the array of cells, and a portion of the array of cells from which the game symbols in the set of game symbols are be removed from the array of cells, wherein a slot game comprises the reel, wherein the slot game comprises a plurality of reels that spin in response to input of a player, wherein, in initiating spin of the reel in the second configuration of the reel, each reel of a plurality of reels is in the second configuration, and further comprising:

determining, based on a number of game credits of the player, whether or not to receive the input of the player regarding the set of game symbols to be removed from the first configuration of the reel.

6. The method of claim 1, wherein a plurality of the number of outcomes field, probability field, pays (1 to X) field, expected value field, and return to player percentage field in the first and second payout tables are different to reflect removal of the one or more occurrences of the selected game symbol, wherein the set of game symbols comprises plural types of game symbols, wherein the game symbol type of the removed one or more occurrences of the selected game symbol in the set of game symbols is a first type of game symbol, wherein a number of the first type of game symbols on the reel in the first configuration is more than a number of the first type of game symbols on the reel in the second configuration and further comprising in the first update, adjusting a number of credits value in a credit meter in response to receiving of player input;

in the second update, further adjusting the number of credits value in the credit meter in response to the second game outcome;

determining a number of spins of the reel in the second configuration of the reel; and updating a spin counter after initiating of a spin of the reel in the second configuration of the reel to indicate a remaining number of spins of the reel while in the second configuration of the reel.

7. The method of claim 6, wherein a slot game comprises the reel and further comprising:

maintaining the removed one or more occurrences of the selected game symbol in a display of the first game payline;

determining, for the slot game, a number of reels in the first configuration of the reel and in the second configuration of the reel, wherein a total number of reels of the slot game is more than a number of reels in the second configuration of the reel;

updating a spin counter to reflect a number of remaining spins available for the second configuration of the reel; and when the spin counter indicates that a further spin of the reel in the second configuration remains, enabling the further spin of the reel in the second configuration for the slot game.

8. A gaming system, comprising:

a set of reels, wherein, in a first configuration, each reel in the set of reels comprises a first plurality of game symbols;

a user interface;

a credit meter;

a random number generator;

a processor coupled with the user interface, random number generator, and credit meter; and a computer-readable storage medium, coupled with the processor, comprising instructions that are executable by the processor, wherein the instructions comprise instructions that cause the processor to:

generate, based on output of the random number generator, a first game outcome comprising a first game payline comprising a first configuration of the set of reels associated with a first payout table of plural payout tables, the first configuration of the set of reels comprising an array of cells comprising a first plurality of game symbols;

store the first game outcome in the computer-readable storage medium;

access, in the computer-readable storage medium, the first payout table;

evaluate the first game outcome based on the first payout table to determine a first update to a credit meter and one or more game symbols eligible for removal from the first configuration of the reel;

based on the evaluating, update, by the first update, the credit meter;

based on the evaluating, determine a set of game symbols to be removed from the first plurality of game symbols in the first configuration of the reel;

map the set of game symbols against payout table metadata fields of plural payout tables to identify a second payout table, the payout table metadata fields each comprising a description of removed occurrences of one or more game symbols associated with a respective payout table, generate, based on further output of the random number generator, a second game outcome comprising a second game payline comprising a second configuration of the reel associated with a second payout table of the plural payout tables, wherein the array of cells in the second configuration of the set of reels comprises a second plurality of game symbols, wherein the generating removes one or more occurrences of a selected game symbol in the set of game symbols from the first configuration of the reel to form the second configuration of the reel, wherein the second configuration of the reel maintains game symbols in corresponding cells adjacent to a cell formerly occupied by the removed occurrence of the selected game symbol, and wherein, in the first configuration of the reel, a game symbol type of the selected game symbol has a first weight towards inclusion in the first game payline and, in the second configuration of the reel, a second weight towards inclusion in a second game payline, the first weight being less than the second weight;

store the second game outcome in the computer-readable storage medium;

evaluate the second game outcome to determine a second update to a credit meter based on the second payout table, wherein one or more of a number of outcomes field, probability field, pays (1 to X) field, expected value field, and return to player percentage field in the first and second payout tables are different to reflect corresponding removal of occurrences of one or more game symbols; and based on the evaluating, update, by the second update, the credit meter.

9. The gaming system of claim 8, wherein, in the generating, each cell in the second game payline is populated with a corresponding symbol in the first plurality of game symbols, wherein a number of game symbols on the reels in the first configuration is more than a number of game symbols on the reels in the second configuration, and wherein the determining the removed one or more occurrences of the selected game symbol in the set of game symbols are determined as an outcome of a matching game and wherein the processor maps to the set of game symbols to be removed from the first plurality of game symbols to determine the second payout table.

10. The gaming system of claim 8, wherein, in the first configuration of the set of reels, a second selected game symbol of the first plurality of game symbols has a first probability of being the first game payline and, in the second configuration of the set of reels, the second selected game symbol has a second probability of being the second game payline, the first probability being different than the second probability, wherein a game symbol type of the removed one or more occurrences of the selected game symbol is different than the game symbol type of the second selected game symbol, and wherein the processor receives a wager from a player regarding the set of game symbols; and wherein in the determining the set of game symbols to be removed from the first plurality of game symbols from the first configuration of the reels is determined as an outcome of a wheel game initiated by a player.

11. The gaming system of claim 8, wherein the game symbol type of the removed one or more occurrences of the selected game symbol in the set of game symbols is one of a standard reel game symbol, a scatter game symbol, a wild symbol, multiplier, and bonus game symbol and wherein in the determining the processor:

determines, based on the first game payline, whether or not to receive first input of a player regarding the one or more game symbols eligible for removal from the first configuration of the set of reels;

selects, randomly based on a random number generator, the removed one or more occurrences of the selected game symbol in the set of game symbols;

adjusts a spin counter value in response to spin of the reel in the second configuration of the set of reels to provide a first spin counter value;

compares the first spin counter value to a predetermined value;

when the first spin counter value is different from the predetermined value, initiates, in response to input of a player, a further spin of the reels in the second configuration of the set of reels to produce a third slot game payline;

adjusts the first spin counter value in response to the further spin to provide a second spin counter value;

generates a display comprising a third slot game outcome from the second game payline;

compares the second spin counter value to the predetermined value; and in response to the second spin counter value being the same as the predetermined value, returns the reels to the first configuration of the set of reels.

12. The gaming system of claim 8, wherein the second payout table is associated with payout table metadata describing one of: a number of game symbols in the set of game symbols to be removed from the array of cells, a type of game symbols in the set of game symbols to be removed from the array of cells, and a portion of the array of cells from which the game symbols in the set of game symbols are be removed from the array of cells, wherein a slot game comprises the set of reels, wherein the slot game comprises a plurality of reels in the set of reels that spin in response to input of a player, wherein, in initiating of a spin of the reel in the second configuration of the set of reels, each reel of a plurality of reels is in the second configuration, and wherein the processor determines, based on a number of game credits of the player, whether or not to receive the input of the player regarding the set of game symbols to be removed from the first configuration of the reel.

13. The gaming system of claim 8, wherein a plurality of the number of outcomes field, probability field, pays (1 to X) field, expected value field, and return to player percentage field in the first and second payout tables are different to reflect removal of the one or more occurrences of the selected game symbol, wherein the set of game symbols comprises plural types of game symbols, wherein the game symbol type of the removed one or more occurrences of the selected game symbol in the set of game symbols is a first type of game symbol, wherein a number of the first type of game symbols on the reels in the first configuration is more than a number of the first type of game symbols on the reels in the second configuration and wherein the processor:

in the first update, adjusts a number of credits value in a credit meter in response to receiving of player input;

in the second update, further adjusts the number of credits value in the credit meter in response to the second game outcome;

determines a number of spins of the reels in the second configuration of the set of reels; and updates a spin counter after initiating a spin of the reels in the second configuration of the set of reels to indicate a remaining number of spins of the reels while in the second configuration of the set of reels.

14. The gaming system of claim 13, wherein a slot game comprises the reel and wherein the processor:

maintains the removed one or more occurrences of the selected game symbol in a display of the first game payline;

determines, for the slot game, a number of reels in the first configuration of the set of reels and in the second configuration of the set of reels, wherein a total number of reels of the slot game is more than a number of reels in the second configuration of the set of reels;

updates a spin counter to reflect a number of remaining spins available for the second configuration of the reel; and when the spin counter indicates that a further spin of the reel in the second configuration remains, enables the further spin of the reel in the second configuration for the slot game.

15. A system, comprising:

a processor;

a user interface;

a random number generator; and a computer-readable storage medium, coupled with the processor and random number generator, comprising instructions that are executable by the processor, wherein the instructions cause the processor to:

generate, based on output of the random number generator, a first game outcome comprising a first game payline comprising a first configuration of a reel associated with a first payout table of plural payout tables, the first configuration of the set of reels comprising an array of cells comprising a first plurality of game symbols;

store the first game outcome in the computer-readable storage medium;

access, in the computer-readable storage medium, the first payout table;

evaluate the first game outcome based on the first payout table to determine a first update to a credit meter and one or more game symbols eligible for removal from the first configuration of the reel;

based on the evaluating, update, by the first update, the credit meter;

based on the evaluating, determine a set of game symbols to be removed from the first plurality of game symbols in the first configuration of the reel;

map the set of game symbols against payout table metadata fields of plural payout tables to identify a second payout table, the payout table metadata fields each comprising a description of removed occurrences of one or more game symbols associated with a respective payout table, generate, based on further output of the random number generator, a second game outcome comprising a second game payline comprising a second configuration of the reel associated with a second payout table of the plural payout tables, wherein the array of cells in the second configuration of the set of reels comprises a second plurality of game symbols, wherein the generating removes one or more occurrences of a selected game symbol in the set of game symbols from the first configuration of the reel to form the second configuration of the reel, wherein the second configuration of the reel maintains game symbols in corresponding cells adjacent to a cell formerly occupied by the removed occurrence of the selected game symbol, and wherein, in the first configuration of the set of reels, a second selected game symbol of the first plurality of game symbols has a first probability of being the first game payline and, in the second configuration of the set of reels, the second selected game symbol has a second probability of being the second game payline, the first probability being different than the second probability;

store the second game outcome in the computer-readable storage medium;

evaluate the second game outcome to determine a second update to a credit meter based on the second payout table, wherein one or more of a number of outcomes field, probability field, pays (1 to X) field, expected value field, and return to player percentage field in the first and second payout tables are different to reflect corresponding removal of occurrences of one or more game symbols; and based on the evaluating, update, by the second update, the credit meter.

16. The system of claim 15, wherein, in the generating, each cell in the second game payline is populated with a corresponding symbol in the first plurality of game symbols, wherein a number of game symbols on the reel in the first configuration is more than a number of game symbols on the reel in the second configuration, and wherein the determining the removed one or more occurrences of the selected game symbol in the set of game symbols are determined as an outcome of a matching game and wherein the processor maps to the set of game symbols to be removed from the first plurality of game symbols to determine the second payout table.

17. The system of claim 15, wherein, in the first configuration of the reel, a game symbol type of the selected game symbol has a first weight towards inclusion in the first game payline and, in the second configuration of the reel, a second weight towards inclusion in a second game payline, the first weight being less than the second weight, wherein a game symbol type of the removed one or more occurrences of the selected game symbol is different than the game symbol type of the second selected game symbol, and wherein the processor receives a wager from a player regarding the set of game symbols; and wherein in the determining the set of game symbols to be removed from the first plurality of game symbols from the first configuration of the reel is determined as an outcome of a wheel game initiated by a player.

18. The system of claim 15, wherein a game symbol type of the removed one or more occurrences of the selected game symbol in the set of game symbols is one of a standard reel game symbol, a scatter game symbol, a wild symbol, multiplier, and bonus game symbol and wherein in the determining the processor:

determines, based on the first game payline, whether or not to receive first input of a player regarding the one or more game symbols eligible for removal from the first configuration of the reel;

selects, randomly based on a random number generator, the removed one or more occurrences of the selected game symbol in the set of game symbols;

adjusts a spin counter value in response to initiating a spin of the reel in the second configuration of the reel to provide a first spin counter value;

compares the first spin counter value to a predetermined value;

when the first spin counter value is different from the predetermined value, initiates, in response to input of a player, a further spin of the reel in the second configuration of the reel to produce a third slot game payline;

adjusts the first spin counter value in response to the further spin to provide a second spin counter value;

generates a display comprising a third slot game outcome from the second game payline;

compares the second spin counter value to the predetermined value; and in response to the second spin counter value being the same as the predetermined value, returns the reel to the first configuration of the reel.

19. The system of claim 15, wherein the second payout table is associated with payout table metadata describing one of: a number of game symbols in the set of game symbols to be removed from the array of cells, a type of game symbols in the set of game symbols to be removed from the array of cells, and a portion of the array of cells from which the game symbols in the set of game symbols are be removed from the array of cells, wherein a slot game comprises the set of reels, wherein the slot game comprises a plurality of reels in the set of reels that spin in response to input of a player, wherein, in initiating of a spin of the reel in the second configuration of the reel , each reel of a plurality of reels is in the second configuration, and wherein the processor determines, based on a number of game credits of the player, whether or not to receive the input of the player regarding the set of game symbols to be removed from the first configuration of the reel.

20. The system of claim 15, wherein a plurality of the number of outcomes field, probability field, pays (1 to X) field, expected value field, and return to player percentage field in the first and second payout tables are different to reflect removal of the one or more occurrences of the selected game symbol, wherein the set of game symbols comprises plural types of game symbols, wherein a game symbol type of the removed one or more occurrences of the selected game symbol in the set of game symbols is a first type of game symbol, wherein a number of the first type of game symbols on the reel in the first configuration is more than a number of the first type of game symbols on the reel in the second configuration and wherein the processor:

in the first update, adjusts a number of credits value in a credit meter in response to receiving of player input;

in the second update, further adjusts the number of credits value in the credit meter in response to the second game outcome;

determines a number of spins of the reel in the second configuration of the reel; and updates a spin counter after initiating of a spin of the reel in the second configuration of the reel to indicate a remaining number of spins of the reel while in the second configuration of the reel.

* * * * *